US011026251B2

(12) United States Patent
Yoshimoto et al.

(10) Patent No.: US 11,026,251 B2
(45) Date of Patent: Jun. 1, 2021

(54) BASE STATION APPARATUS, TERMINAL APPARATUS, AND COMMUNICATION METHOD THEREFOR

(71) Applicants: SHARP KABUSHIKI KAISHA, Sakai (JP); FG INNOVATION COMPANY LIMITED, Tuen Mun (HK)

(72) Inventors: Takashi Yoshimoto, Sakai (JP); Jungo Goto, Sakai (JP); Osamu Nakamura, Sakai (JP); Ryota Yamada, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/099,935

(22) PCT Filed: May 10, 2017

(86) PCT No.: PCT/JP2017/017662
§ 371 (c)(1),
(2) Date: Nov. 8, 2018

(87) PCT Pub. No.: WO2017/195815
PCT Pub. Date: Nov. 16, 2017

(65) Prior Publication Data
US 2019/0141731 A1  May 9, 2019

(30) Foreign Application Priority Data
May 12, 2016 (JP) .............................. JP2016-096132

(51) Int. Cl.
*H04W 72/12* (2009.01)
*H04W 74/08* (2009.01)
(Continued)

(52) U.S. Cl.
CPC ....... *H04W 72/1284* (2013.01); *H04W 72/12* (2013.01); *H04W 72/14* (2013.01);
(Continued)

(58) Field of Classification Search
CPC . H04W 72/14; H04W 76/27; H04W 74/0808; H04W 72/1278; H04W 74/002;
(Continued)

(56) References Cited

U.S. PATENT DOCUMENTS

2011/0039568 A1   2/2011  Zhang et al.
2012/0207082 A1*  8/2012  Liu ...................... H04L 5/0007
                                                       370/315
(Continued)

FOREIGN PATENT DOCUMENTS

JP   2011-142532 A   7/2011
JP   2013-502163 A   1/2013
(Continued)

OTHER PUBLICATIONS

"3rd Generation Partnership Project; Technical Specification Group Services and System Aspects; Service requirements for Machine-Type Communications (MTC); Stage 1 (Release 13) The present", 3GPP TS 22.368 V13.1.0 (Dec. 2014).
(Continued)

*Primary Examiner* — Rownak Islam
(74) *Attorney, Agent, or Firm* — ScienBiziP, P.C.

(57) ABSTRACT

Provided are a base station apparatus, a terminal apparatus, and a communication method, in a case that uplink data transmission based on orthogonal multiple access and uplink data transmission based on non-orthogonal multiple access coexist in a cell in which many terminal apparatuses present, capable of maintaining a prescribed communication quality for the uplink data. The base station apparatus for communicating with a terminal apparatus configured to support (Continued)

contention based access and non-contention based access transmits, in a case that an uplink data channel received in a non-contention based manner occurs in a subframe including the contention based access region, a contention based transmission configuration change notification with respect to a subframe configured to receive the uplink data channel.

8 Claims, 14 Drawing Sheets

(51) Int. Cl.
*H04W 74/02* (2009.01)
*H04W 76/27* (2018.01)
*H04W 72/14* (2009.01)

(52) U.S. Cl.
CPC ............ *H04W 74/02* (2013.01); *H04W 74/08* (2013.01); *H04W 76/27* (2018.02)

(58) Field of Classification Search
CPC ... H04W 72/12; H04W 2/1284; H04W 74/02; H04W 74/08; H04W 72/1284
USPC ......................................................... 370/329
See application file for complete search history.

(56) References Cited

U.S. PATENT DOCUMENTS

| | | | |
|---|---|---|---|
| 2013/0102320 A1 | 4/2013 | Suzuki et al. | |
| 2015/0029964 A1* | 1/2015 | Seo | H04L 5/001 370/329 |
| 2015/0244485 A1* | 8/2015 | Nguyen | H04W 72/0446 370/280 |
| 2016/0127090 A1* | 5/2016 | Takeda | H04L 5/0035 370/329 |
| 2017/0215201 A1* | 7/2017 | Kim | H04L 1/1812 |
| 2018/0255550 A1* | 9/2018 | Takeda | H04L 5/0094 |
| 2018/0310335 A1* | 10/2018 | Tang | H04W 76/27 |
| 2019/0116489 A1* | 4/2019 | Harada | H04W 72/0453 |

FOREIGN PATENT DOCUMENTS

| | | |
|---|---|---|
| JP | 2013-516944 A | 5/2013 |
| WO | 2011/085403 A1 | 7/2011 |
| WO | 2015/137632 A1 | 9/2015 |

OTHER PUBLICATIONS

"3rd Generation Partnership Project; Technical Specification Group Radio Access Networks; Narrowband Internet of Things (NB-IoT); Technical Report for BS and UE radio transmission and reception (Release 13)", 3GPP TR 36.802 V0.1.0 (Feb. 2016).

Intel Corporation, "New SI proposal: Uplink non-orthogonal transmission for small data", RP-160431, 3GPP TSG RAN Meeting#71, Göteborg, Sweden,Mar. 7-10, 2016.

Ericsson, "DCI for short TTI uplink transmissions", R1-160938, 3GPP TSG-RAN WG1 Meeting #84, Malta, Feb. 15-19, Feb. 6, 2016.

Catt, "Feedback for SPS PDCCH command", R2-162515, 3GPP TSG-RAN WG2 Meeting #93bis, Dubrovnik, Croatia, Apr. 11-15, 2016.

LG Electronics, "Physical layer aspect of processing time for shortened TTI", R1-162511, 3GPP TSG-RAN WG1 Meeting #84bis, Busan, Korea Apr. 11-15, 2016.

* cited by examiner

BASE STATION APPARATUS, TERMINAL APPARATUS, AND COMMUNICATION METHOD THEREFOR

TECHNICAL FIELD

The present invention relates to a base station apparatus, a terminal apparatus, and a communication method therefor.

BACKGROUND ART

In a communication system, such as the Long Term Evolution (LTE), the LTE-Advanced (LTE-A), or the like, specified in the Third Generation Partnership Project (3GPP), a terminal apparatus (User Equipment (UE)) transmits, in a case of including transmission data in an uplink buffer, a Scheduling Request (SR), a Buffer Status Report (BSR), or the like to a base station apparatus (evolved Node B (eNodeB)). Thereafter, the terminal apparatus transmits data by a prescribed radio resource in a case of receiving control information of an uplink transmission grant (UL Grant) from the base station apparatus, based on an uplink transmission parameter included in the UL Grant. In this manner, the base station apparatus controls radio resources for all the uplink data transmissions (data transmission from the terminal apparatus to the base station apparatus). By the base station apparatus controlling the uplink radio resource, Orthogonal Multiple Access (OMA) is enabled.

The 3GPP is in the process of creating specifications for Machine Type Communication (MTC), Machine-to-Machine (M2M), and Narrow Band-IoT (NB-IoT) (Non Patent Literature 1 and Non Patent Literature 2). These make it possible for many terminal apparatuses to transmit and/or receive small size data. Furthermore, under a concept of Internet of Things (IoT), it is expected that many devices such as sensors or the like transmit and/or receive small data in the future. In such a situation, in the OMA, regardless of the size of the data to be transmitted, the terminal apparatus transmits and/or receives the control information before transmitting the uplink data. As a result, in a case that transmission data with small size increase, a ratio of overhead such as the control information or the like relatively increases.

As a method for suppress the overhead from increasing due to the control information, there is a contention based (Grant less) radio communication technique (Non Patent Literature 3). In a case that the terminal apparatuses transmit uplink data in the contention based radio communication, data transmitted by multiple terminal apparatuses at the same time and the same frequency collide with one another, data are non-orthogonally multiplexed in a space, from the terminal apparatuses of the number exceeding the number of the receive antennas of the base station apparatus. The base station apparatus that supports the contention based radio communication technique can detect a transmission data signal by applying turbo equalization, a Successive Interference Canceller (SIC), or a Symbol Level Interference Canceller (SLIC). With this, the terminal apparatus can perform communication without performing SR transmission, UL Grant reception, and the like. Furthermore, the contention based radio communication technique can shorten time from transmission data occurrence to the transmission.

CITATION LIST

Non-Patent Literature

Non Patent Literature 1: "Service requirements for Machine-Type Communications (MTC); Stage 1 (Release 13)" 3GPP TS 22.368 v13.1.0 (2014-12)

Non Patent Literature 2: "Narrowband Internet of Things (NB-IoT); Technical Report for BS and UE radio transmission and reception (Release 13)" 3GPP TR 36.802 v0.1.0 (2016-02)

Non Patent Literature 3: RP-160431, 3GPP TSG RAN Meeting #71, Goteborg, Sweden, March 7-10, 2016

DISCLOSURE OF THE INVENTION

Problems to be Solved by the Invention

However, in a certain cell, coexistence of a terminal apparatus which supports Non-Orthogonal Multiple Access (NOMA) enabled through the contention based radio communication technique and a terminal apparatus which does not support the NOMA (a terminal apparatus which supports only the OMA) can be considered. In this case, in a case that the uplink transmission data based on the OMA and the uplink transmission data based on the NOMA are transmitted at the same time and the same frequency, there is a risk that communication quality of the uplink transmission data based on the OMA will be degraded. Additionally, in a case that the uplink transmission data based on the NOMA of the number exceeding an interference removal capability of a reception device are transmitted at the same time and the same frequency, a case that the terminal apparatus cannot detect the uplink transmission data based on the NOMA arises, and thus there is a risk that a desired communication quality will not be maintained.

The present invention has been made in view of such circumstances, and an object of the invention is to provide a base station apparatus, a terminal apparatus, and a communication method, in a case that uplink data transmission based on OMA and uplink data transmission based on NOMA coexist in a cell in which many terminal apparatuses present, capable of maintaining a prescribed communication quality for the uplink data.

Means for Solving the Problems

To address the above-mentioned drawbacks, a base station apparatus, a terminal apparatus, and a communication method according to the present invention are configured as follows.

(1) An aspect of the present invention is a base station apparatus for communicating with a terminal apparatus configured to support contention based access and non-contention based access, the base station apparatus includes: a higher layer processing unit configured to make a configuration for indicating an allocation of a contention based access region and a non-contention based access region; a transmitter configured to transmit radio frame format configuration information for indicating the allocation of the contention based access region and the non-contention based access region; and a receiver configured to receive an uplink data channel based on a radio frame format constituted of the contention based access region and the non-contention based access region, in which, in a case that the uplink data channel received in a non-contention based manner occurs in a subframe including the contention based access region, the transmitter transmits a contention based transmission configuration change notification for indicating that the subframe configured to receive the uplink data channel is changed to a subframe configured to perform a non-contention based transmission.

(2) Additionally, in the aspect of the present invention, the contention based transmission configuration change notification may be a contention based access prohibition notification with respect to the subframe configured to receive the uplink data channel.

(3) Additionally, in the aspect of the present invention, the contention based transmission configuration change notification may be broadcast to the terminal apparatus connecting to the base station apparatus.

(4) Additionally, in the aspect of the present invention, the transmitter may transmit the contention based transmission configuration change notification using downlink control information.

(5) Additionally, in the aspect of the present invention, the contention based access region and the non-contention based access region of the radio frame format may be subjected to frequency division multiplexing, and in a case that the uplink data channel transmitted in a non-contention based manner occurs across a frequency band of the contention based access region and a frequency band of the non-contention based access region, the contention based transmission configuration change notification with respect to the subframe configured to receive the uplink data channel may be transmitted.

(6) Additionally, in the aspect of the present invention, the receiver may receive an uplink control channel including uplink control information, and the higher layer processing unit may configure, in a case that the uplink control channel occurs in the subframe including the contention based access region, whether to perform reception in the subframe in accordance with the uplink control information.

(7) Additionally, in the aspect of the present invention, the higher layer processing unit may make, in a case that the uplink control information does not include an ACK/NACK, a configuration for receiving the uplink control channel in the subframe including the contention based access region.

(8) Additionally, in the aspect of the present invention, the higher layer processing unit may make, in a case that the uplink control information includes the ACK/NACK, a configuration for receiving the uplink control channel in a non-contention based access region allocated next to the subframe including the contention based access region.

(9) An aspect of the present invention is a notification method of a base station apparatus for communicating with a terminal apparatus configured to support contention based access and non-contention based access, a communication method includes the steps of: making a configuration for indicating an allocation of a contention based access region and a non-contention based access region; transmitting radio frame format configuration information for indicating the allocation of the contention based access region and the non-contention based access region; and receiving an uplink data channel based on a radio frame format constituted of the contention based access region and the non-contention based access region, in which, in a case that the uplink data channel received in a non-contention based manner occurs in a subframe including the contention based access region, the transmitter transmits a contention based transmission configuration change notification for indicating that the subframe configured to receive the uplink data channel is changed to a subframe configured to perform a non-contention based transmission.

(10) An aspect of the present invention is a terminal apparatus for communicating with a base station apparatus configured to support contention based access and non-contention based access, the terminal apparatus includes: a receiver configured to receive radio frame format configuration information for indicating an allocation of a contention based access region and the non-contention based access region; and a transmitter configured to transmit an uplink data channel based on a radio frame format constituted of the contention based access region and the non-contention based access region, in which a contention based transmission configuration change notification indicates a change to a subframe configured to perform a non-contention based transmission, and in a case that the receiver receives the contention based transmission configuration change notification with respect to the contention based access region included in the radio frame format, regardless of whether the subframe indicated by the contention based transmission configuration change notification is the contention based access region or the non-contention based access region, the uplink data channel is transmitted in a non-contention based manner.

(11) An aspect of the present invention is a communication method of a terminal apparatus for communicating with a base station apparatus configured to support contention based access and non-contention based access, the communication method includes the steps of: receiving radio frame format configuration information for indicating an allocation of a contention based access region and the non-contention based access region; and transmitting an uplink data channel based on a radio frame format constituted of the contention based access region and the non-contention based access region, in which a contention based transmission configuration change notification indicates a change to a subframe configured to perform a non-contention based transmission, and in a case that the terminal apparatus receives the contention based transmission configuration change notification with respect to the contention based access region included in the radio frame format, regardless of whether the subframe indicated by the contention based transmission configuration change notification is the contention based access region or the non-contention based access region, the uplink data channel is transmitted in a non-contention based manner.

Effects of the Invention

According to the present invention, in a case that uplink data transmission based on OMA and uplink data transmission based on NOMA coexist in a cell in which many terminal apparatuses present, a prescribed communication quality for the uplink data can be maintained.

MODE FOR CARRYING OUT THE INVENTION

First Embodiment

A communication system according to the present embodiment includes a base station apparatus (a transmission device, cells, small cells, serving cells, a transmission point, a group of transmit antennas, a group of transmit antenna ports, component carriers, eNodeB, Home eNodeB) and terminal apparatuses (a terminal, a mobile terminal, a reception point, a reception terminal, a reception device, a group of receive antennas, a group of receive antenna ports, UE). The communication system is not limited to data communication between a terminal apparatus and base station apparatus with human intervention, can also be applied to a form of data communication, which does not require the human intervention, such as Machine Type Communication (MTC), Machine-to-Machine Communication (M2M communication), Internet of Things (IoT) communication, Narrow Band-IoT (NB-IoT), or the like (hereinafter, referred to as MTC). In this case, the terminal apparatus is an MTC terminal. The communication system can also be applied to Device-to-Device (D2D) communication. In this case, a transmission device and a reception device both are the terminal apparatus. Note that although a case that Discrete Fourier Transform Spread-Orthogonal Frequency Division Multiplexing (DFTS-OFDM, also referred to as SC-FDMA) modulation is used for uplink, and OFDM modulation is used for downlink will be described below, the scheme is not limited thereto, other modulation schemes can be applied.

The base station apparatus and the terminal apparatus according to the present embodiment can communicate with a frequency band that is a so-called licensed band with use authorization (license) from a country or a region in which a radio operator provides a service and/or a frequency band that is a so-called unlicensed band that does not require the use authorization (license) from the country or the region.

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
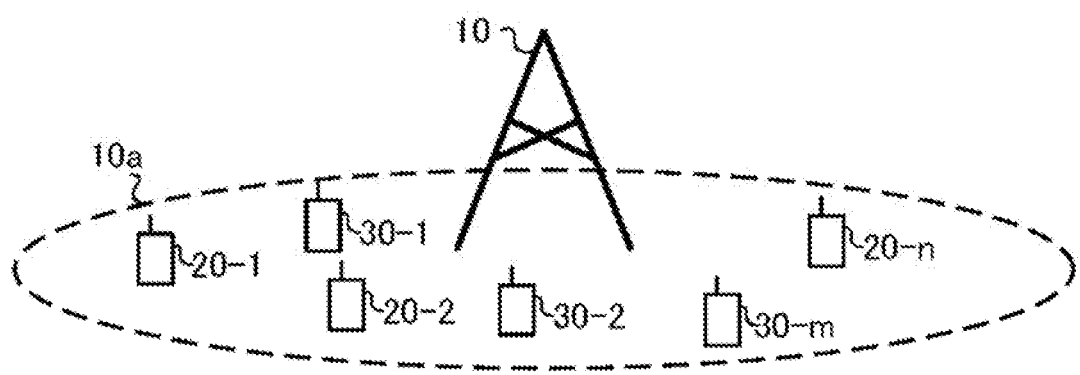
FIG. 1 is a diagram illustrating an example of a communication system according to a first embodiment.

FIG. 1 is a diagram illustrating an example of a communication system according to the present embodiment. The communication system according to the present embodiment includes a base station apparatus 10, terminal apparatuses 20-1 to 20-n, and terminal apparatuses 30-1 to 30-m (n and m are natural numbers). The terminal apparatuses 20-1 to 20-n are also collectively referred to as terminal apparatuses 20. The terminal apparatuses 30-1 to 30-m are also collectively referred to as terminal apparatuses 30. Coverage 10a is a range (a communication area) in which the base station apparatus 10 can be connected to the terminal apparatuses 20 and 30 (also referred to as a cell).

In FIG. 1, the terminal apparatus 20 supports non-contention based multiple access. In the non-contention based multiple access, the terminal apparatuses 20 transmit uplink data based on an uplink transmission grant (UL Grant) received from the base station apparatus 10 (also referred to as non-contention based access or scheduled access data transmission). In radio communication of the non-contention based multiple access, uplink data signals transmitted by the terminal apparatuses are orthogonal to one another in time/frequency/space resources (for example, an antenna port, a beam pattern, and a precoding pattern) (also referred to as uplink orthogonal multiple access). In this case, at the same time and the same frequency, the total number of transmit antennas of the terminal apparatuses 20 that transmit the uplink data is preferably equal to or less than the number of receive antennas of the base station apparatus 10.

In FIG. 1, the terminal apparatus 30 at least supports contention based multiple access. In the contention based multiple access, the terminal apparatuses 30 transmit uplink data regardless of reception of the UL Grant from the base station apparatus 10 (also referred to as contention based access, grant-free access, or grant-less access data transmission). In radio communication of the contention based multiple access, the uplink data transmitted by the terminal apparatuses 30 are allowed to overlap with one another in time/frequency/space resources (also referred to as UpLink Non Orthogonal Multiple Access (UL-NOMA)). In the radio communication of the contention based multiple access, in a case that the terminal apparatuses 30 transmit the uplink data at the same time and the same frequency, uplink data signals transmitted from the terminal apparatuses of the number exceeding the number of the receive antennas of the base station apparatus are non-orthogonally multiplexed in the space. Note that both the non-contention based multiple access and the contention based multiple access can also be applied to the terminal apparatus 30. Which multiple access is applied may be configured in a UE category of the terminal apparatus 30. The UE category is determined by the maximum number of transport blocks received from the terminal apparatus, a modulation scheme supported by the terminal apparatus, the number of layers supported by the terminal apparatus, or the like.

The base station apparatus 10 detects the non-orthogonally multiplexed uplink data signal. The base station apparatus 10 may include, in order to detect the uplink data signal, Symbol Level Interference Cancellation (SLIC) configured to cancel the interference based on a demodulation result of the interference signal, Codeword Level Interference Cancellation (CWIC) configured to cancel the interference based on a decoding result of the interference signal, turbo equalization, maximum likelihood (ML), Reduced complexity maximum likelihood (R-ML) detection configured to search for the most likely signal to be transmitted among the transmission signal candidates, Enhanced Minimum Mean Square Error-Interference Rejection Combining (EMMSE-IRC) configured to prevent the interference signal by linear computation, or the like.

In the uplink radio communication in FIG. 1, the following uplink physical channels are used. The uplink physical channels are used for transmission of information output from higher layers.

Physical Uplink Control CHannel (PUCCH)
Physical Uplink Shared CHannel (PUSCH)
Physical Random Access CHannel (PRACH)

The PUCCH is used to transmit Uplink Control Information (UCI). Multiple UCI formats (PUCCH formats) are defined for transmission of the uplink control information. In other words, a field for the uplink control information is defined in the UCI format and is mapped to information bits.

The Uplink Control Information includes a positive ACKnowledgement (ACK) or a Negative ACKnowledgement (NACK) (ACK/NACK) for downlink data (a downlink transport block or a Downlink-Shared CHannel (DL-SCH)). The ACK/NACK is also referred to as an HARQ-ACK or HARQ feedback. The uplink control information includes a Scheduling Request (SR). The SR is a message configured to request transmission of the UL Grant in order to transmit uplink data (for example, PUSCH).

The Uplink Control Information includes Channel State Information (CSI) for the downlink. The Channel State Information refers to a Rank Indicator (RI) specifying a suited spatial multiplexing number, a Precoding Matrix Indicator (PMI) specifying a suited precoder, a Channel Quality Indicator (CQI) specifying a suited transmission rate, and the like.

The Channel Quality Indicator CQI (hereinafter, referred to as a CQI value) can be a suited modulation scheme (e.g., QPSK, 16QAM, 64QAM, 256QAM, or the like) and a suited coding rate in a predetermined band. The CQI value can be an index (CQI Index) determined by the above modulation scheme, coding rate, and the like. The CQI value can take a value determined beforehand in the system. The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Values of the Rank Indicator, the Precoding Matrix Indicator, and the Channel Quality Indicator CQI are collectively referred to as CSI values.

The PUCCH format is associated with a combination of the ACK/NACK, the CSI, and the SR. For example, as the uplink control information, the PUCCH format including only the SR is defined. As the uplink control information, the PUCCH format including the CSI is defined. As the uplink control information, the PUCCH format including the ACK/NACK is defined. The PUCCH format including the ACK/NACK is defined in accordance with the number of component carriers in carrier aggregation. The PUCCH format including the ACK/NACK is defined in accordance with the number of spatial multiplexing. As the uplink control information, the PUCCH format including the ACK/NACK and the CSI is defined. As the uplink control information, the PUCCH format including the ACK/NACK and the SR is defined. As the uplink control information, the PUCCH format including the CSI and the SR is defined. As the uplink control information, the PUCCH format including the ACKlNACK, the CSI, and the SR is defined. The PUCCH format can be defined only in a case of the radio communication of the non-contention based multiple access. In other words, it means that, in the radio communication of the contention based multiple access, transmission of the PUCCH is not performed.

In the communication system according to the present embodiment, the PUCCH format can also be associated with the non-contention based/contention based multiple access (orthogonal multiple access/non-orthogonal multiple access). For example, the PUCCH format including the SR in the non-contention base is defined while being distinguished from the format including the SR in the contention base. The PUCCH format including the ACK/NACK in the non-contention base is defined while being distinguished from the format including the ACK/NACK in the contention base. The PUCCH format including the CSI in the non-contention base is defined while being distinguished from the format including the CSI in the contention base.

The PUCCH may be generated by adding Cyclic Redundancy Check (CRC) to the uplink control information. Furthermore, in the PUCCH, the uplink control information/CRC may be scrambled (exclusive OR operation) using a prescribed identification signal. For example, in the PUCCH of the radio communication of the contention based multiple access, the uplink control information/CRC is scrambled using a Cell-Radio Network Temporary Identifier (C-RNTI) as the identification signal. The identification signal is a signal for the base station apparatus 10 to identify each of the terminal apparatuses 20 and 30.

In the C-RNTI, an identifier specific to the contention based multiple access distinguished from the non-contention based multiple access may be defined. The identification signal is specified by a position of the OFDM symbol where the signal is allocated/a position of the subcarrier/a phase rotation pattern. The identification signal may be specified by a position of the OFDM symbol where the reference signal is allocated/a position of the subcarrier where the reference signal is allocated/a phase rotation pattern applied to the reference signal. Note that the CRC and the scrambling may be applied only to the radio communication of the contention based multiple access, or may be applied to both kinds of the radio communication of the contention based multiple access and the non-contention based multiple access.

PUSCH is used for transmission of uplink data (an uplink transport block, UL-SCH). The PUSCH is transmitted in a contention based manner/a non-contention based manner. The PUSCH may be used for transmission of the ACK/NACK and/or the Channel State Information. The PUSCH may be used to transmit the Uplink Control Information.

The PUSCH is used to transmit a Radio Resource Control (RRC) message. The RRC message is information/a signal that is processed in a radio resource control layer. The PUSCH is used to transmit an MAC Control Element (CE). The MAC CE is a signal/information that is processed (transmitted) in a Medium Access Control (MAC) layer. For example, a power headroom may be included in MAC CE and may be reported via PUSCH. In other words, a MAC CE field is used to indicate a level of the power headroom. The uplink data includes the RRC message and the MAC CE.

The PUSCH may be generated by adding the Cyclic Redundancy Check (CRC) to the uplink data. In the generation of the CRC, the ACK/NACK and/or the Channel State Information may be included. In the PUSCH, the uplink data/CRC may be scrambled (exclusive OR operation) using a prescribed identification signal. For example, in the PUSCH in the radio communication of the contention base, the uplink data/CRC is scrambled using the Cell-Radio Network Temporary Identifier (C-RNTI) as the identification signal. The C-RNTI can be an identifier specific to the radio communication of the contention based multiple access distinguished from the radio communication of the non-contention based multiple access. The identification signal can be defined in the same manner as the PUCCH.

The terminal apparatus receives the ACK/NACK for the uplink data. In this case, the terminal apparatus retransmits the uplink data itself or data relating to the uplink data. In a case of receiving the NACK for the uplink data transmitted in a non-contention based manner, the terminal apparatus may retransmit the data relating to the uplink data in a contention based manner. In this case, the terminal apparatus retransmits the data using a resource assigned for the contention base in a DCI format.

The terminal apparatus 30 may determine whether to perform the non-contention based transmission or the contention based transmission for the uplink data in accordance with Quality of Service (Qos) or an application for which the data is used. The Quality of Service (Qos) may include a data transmission rate, a desired error rate performance, a packet priority in accordance with a type of communication such as audio data, image data, or the like, real-time property (delay time), or the like. The terminal apparatus 30 may determine whether to perform the non-contention based transmission or the contention based transmission for the uplink data in accordance with a data amount thereof (the number of transmission bits). For example, in a case of transmitting uplink data constituted of packets of the number equal to or less than a threshold value x bits, the terminal apparatus 30 can perform the contention based transmission for the uplink data. The base station apparatus 10 can configure the threshold value x. The terminal apparatus 30 may determine whether to perform the non-contention based transmission or the contention based transmission for the uplink data in accordance with a transmission mode.

The PRACH is used to transmit a random access preamble.

In the uplink radio communication, an UpLink Reference Signal (UL RS) is used as an uplink physical signal. The uplink physical signal is not used for transmission of information output from higher layers, but is used by the physical layer. The Uplink Reference Signal includes a Demodulation Reference Signal (DMRS) and a Sounding Reference Signal (SRS).

The DMRS is associated with transmission of the PUSCH or the PUCCH. For example, the base station apparatus 10 uses the DMRS in order to perform channel compensation when demodulating the PUSCH or the PUCCH. The SRS is not associated with the transmission of the PUSCH or the PUCCH. For example, the base station apparatus 10 uses the SRS to measure an uplink channel state.

The DMRS may be scrambled (exclusive OR operation) using an identification signal. The identification signal may be a signal determined by a position of the OFDM symbol where the DMRS is allocated/a position of the subcarrier where the DMRS is allocated/a phase rotation pattern applied to the DMRS. The identification signal applied to the DMRS can be associated with the identification signal applied to the PUCCH/PUSCH. For example, in the contention based transmission, in a case that the terminal apparatus transmits the DMRS and the PUSCH scrambled by the same identification signal, the base station apparatus performs channel estimation and identification (specification) of the terminal apparatus that is supposed to have transmitted the PUSCH using the DMRS, and then performs reception processing for the PUSCH.

In the downlink radio communication in FIG. 1, the following downlink physical channels are used. The downlink physical channels are used for transmission of information output from higher layers.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

PBCH is used for broadcasting a Master Information Block (MIB, a Broadcast CHannel (BCH)) that is shared by the terminal apparatuses. The PBCH includes information such as a system band, a System Frame number (SFN), the number of transmit antennas used by an eNB, and the like. PCFICH is used for transmission of information indicating a region (e.g., the number of OFDM symbols) to be used for transmission of PDCCH.

The PHICH is used for transmission of the ACK/NACK with respect to uplink data (a transport block, a codeword) received by the base station apparatus. In other words, PHICH is used for transmission of a HARQ indicator (HARQ feedback) indicating ACK/NACK with respect to the uplink data. The terminal apparatus reports the ACK/NACK having been received to a higher layer. The ACK/NACK includes the ACK indicating a successful reception, the NACK indicating an unsuccessful reception, and a DTX indicating that no corresponding data is present. In a case that the PHICH for uplink data is not present, the terminal apparatus reports the ACK to a higher layer.

The communication system according to the present embodiment may be configured such that the transmission of the ACK/NACK can be applied only to the radio communication of the non-contention based multiple access. In other words, for the PUSCH transmitted in a contention based manner, the transmission of the ACK/NACK is not performed. In this case, for the PUSCH transmitted in a contention based manner, the PHICH is not transmitted. Note that retransmission may be applied only to the non-contention base (the retransmission is not applied to the contention base).

The PDCCH and the EPDCCH are used to transmit Downlink Control Information (DCI). Multiple DCI formats are defined for transmission of the downlink control information. In other words, a field for the downlink control information is defined in a DCI format and is mapped to information bits. The DCI format includes control information for downlink data transmission and control information for uplink data transmission.

For example, as a DCI format for the downlink data transmission, a DCI format 1A to be used for the scheduling of one PDSCH in one cell (transmission of a single downlink transport block) is defined.

The DCI format for the downlink data transmission includes downlink control information such as information of PDSCH resource assignment, information of a Modulation and Coding Scheme (MCS) for the PDSCH, a TPC command for the PUCCH, and the like. The DCI format for the downlink data transmission is also referred to as a downlink grant (or downlink assignment).

For example, as the DCI format for the uplink data transmission, a DCI format 0 to be used for the scheduling of one PUSCH in one cell (transmission of a single uplink transport block) is defined.

The DCI format for the uplink data transmission includes uplink control information such as information of PUSCH resource assignment, information of the MCS for the PUSCH, information of Redundancy Version (RV) for the PUSCH, information of a cyclic shift for the DMRS, a TPC command for the PUSCH, and the like. The DCI format for the uplink is also referred to as an uplink grant (or uplink assignment).

The DCI format for the uplink data transmission can be used to request (CSI request) downlink Channel State Information (CSI, also called reception quality information). The Channel State Information refers to the Rank Indicator (RI) specifying a suited number of spatial multiplexing, the Precoding Matrix Indicator (PMI) specifying a suited precoder, the Channel Quality Indicator (CQI) specifying a suited transmission rate, Precoding type Indicator (PTI) and the like.

The DCI format for the uplink data transmission can be used for a configuration indicating an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

For example, the CSI feedback report can be used for a configuration indicating an uplink resource to report aperiodic Channel State Information (Aperiodic CSI). The CSI feedback report can be used for a mode configuration (CSI report mode) to aperiodically report the Channel State Information. The base station apparatus can configure the periodic CSI feedback report or the aperiodic CSI feedback report. The base station apparatus can also configure both the periodic CSI feedback report and the aperiodic CSI feedback report.

The DCI format for the uplink data transmission can be used for a configuration indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case where a PDSCH resource is scheduled in accordance with the downlink assignment, the terminal apparatus receives downlink data on the scheduled PDSCH. In a case that the PUSCH/PUCCH resource is scheduled using the uplink grant, the terminal apparatus that supports the non-contention based uplink transmission can transmit the uplink data and/or the uplink control information by the resource of the scheduled PUSCH/PUCCH.

The DCI format for the uplink data transmission can include a Downlink Assignment Index (DAI). The DAI is used for an uplink and downlink configuration in a Time Division Duplex (TDD) frame.

The DCI format for the uplink data transmission can be used to configure a region for non-contention based transmission and a region for contention based transmission (hereinafter, referred to as non-contention based-contention based configuration). The non-contention based-contention based configuration can be configured in a subframe unit. The non-contention based-contention based configuration can be configured in a slot unit. The non-contention based-contention based configuration can be configured in a symbol unit (as for definition of the radio frame, the subframe, and the symbol, see FIG. 7). Note that the non-contention based-contention based configuration can be included in the DAI. The non-contention based-contention based configuration can also be included in the DCI format for the downlink data transmission.

The PDCCH is generated by adding the Cyclic Redundancy Check (CRC) to the downlink control information. In the PDCCH, the downlink control information/CRC is scrambled (exclusive OR operation) using a prescribed identification signal. For example, the uplink control information/CRC is scrambled using the Cell-Radio Network Temporary Identifier (C-RNTI) as the identification signal. In the C-RNTI, an identifier specific to the contention based radio communication distinguished from the non-contention based radio communication may be defined. The identification signal may be associated with a signal for identifying the terminal apparatus that performs transmission in a contention based manner and an uplink data signal subjected to the contention based transmission (for example, the PUSCH).

In addition to the DCI format for the downlink data transmission and the DCI format for the uplink data transmission, a DCI format for the contention based transmission may be defined. The DCI format for the contention based transmission may be scrambled with an identifier specific to the contention based radio communication. The DCI format for the contention based transmission is used for notification of control information for the contention based transmission. For example, the DCI format for the contention based transmission includes the control information for the contention based transmission such as the non-contention based-contention based configuration, a cycle in which the contention based transmission can be performed (a subframe interval, a slot interval, a frame interval, or the like), and the like.

PDSCH is used for transmission of downlink data (a downlink transport block, DL-SCH). The PDSCH is used to transmit a system information block type 1 message. The system information block type 1 message is cell-specific information.

The PDSCH is used to transmit a system information message. The system information message includes a system information block X other than the system information block type 1. The system information message is cell-specific information. The system information message may include a system information block specific to the contention based transmission. For example, the system information block specific to the contention based transmission includes the control information for the contention based transmission such as the non-contention based-contention based configuration, a cycle in which the contention based transmission can be performed, and the like. Note that a part or all of the system information message can be included in the RRC message.

The PDSCH is used to transmit the RRC message. The RRC message can include a message for the control information of the contention based transmission. The RRC message transmitted from the base station apparatus may be shared (cell-specific) by multiple terminal apparatuses in the cell. In other words, the information common to user devices in the cell is transmitted using the cell-specific RRC message. The RRC message transmitted from the base station apparatus may be a dedicated message to a given terminal apparatus (also referred to as dedicated signaling). In other words, user-equipment-specific information (unique to user equipment) is transmitted using a message dedicated to the given terminal apparatus. Furthermore, the RRC message transmitted from the base station apparatus may be a message dedicated to the contention based transmission. In other words, the information specific to the contention based transmission may be transmitted using the message dedicated to the contention based transmission.

The PDSCH is used for transmission of the MAC CE. The RRC message and/or the MAC CE is also referred to as higher layer signaling.

The PDSCH can be used to request downlink channel state information. The PDSCH can be used for transmission of an uplink resource to which a CSI feedback report is mapped, the CSI feedback report being fed back to the base station apparatus by the terminal apparatus. For example, the CSI feedback report can be used for a configuration indicating an uplink resource to report periodic channel state information (Periodic CSI)/aperiodic channel state information (Aperiodic CSI). The CSI feedback report can be used for a mode configuration (CSI report mode) to periodically/aperiodically report the Channel State Information.

The type of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

The communication system according to the present embodiment can define a contention base-dedicated physical channel. The contention base-dedicated physical channel is used to transmit the control information specific to the contention based transmission generated in the higher layer signaling. For example, on the contention base-dedicated physical channel, the control information for the contention based transmission, such as the non-contention based-contention based configuration, a cycle in which the contention based transmission can be performed, or the like, is transmitted. On the contention base-dedicated physical channel, periodic transmission can be performed by a prescribed subframe in the downlink radio resource format. The terminal apparatuses being connected to the cell 10a can commonly (cell-specifically) read the contention base-dedicated physical channel. The contention base-dedicated physical channel may be a channel specific to the terminal apparatus.

In the downlink radio communication, a Synchronization signal (SS) and a DownLink Reference Signal (DL RS) are used as downlink physical signals. The downlink physical signals are not used for transmission of information output from the higher layers, but are used by the physical layer.

The Synchronization signal is used for the terminal apparatus to be synchronized to frequency and time domains in the downlink. The Downlink Reference Signal is used for the terminal apparatus to perform channel compensation on the downlink physical channel. For example, the Downlink Reference Signal is used for the terminal apparatus to calculate the downlink Channel State Information.

The Downlink Reference Signals include a Cell-specific Reference Signal (CRS), a UE-specific Reference Signal (URS) or a terminal apparatus-specific reference signal relating to the PDSCH, a Demodulation Reference Signal (DMRS) relating to the EPDCCH, a Non-Zero Power Chanel State Information-Reference Signal (NZP CSI-RS), and a Zero Power Chanel State Information-Reference Signal (ZP CSI-RS).

The CRS is transmitted so as to be dispersed in all bands of the subframe and is used to perform demodulation of the PBCH/PDCCH/PHICH/PCFICH/PDSCH. The URS relating to the PDSCH is transmitted in the subframe and the band that are used for transmission of the PDSCH to which the URS relates, and is used to demodulate the PDSCH to which the URS relates. The CRS can also be used for measurement.

DMRS relating to EPDCCH is transmitted in a subframe and a band that are used for transmission of EPDCCH to which DMRS relates. DMRS is used to demodulate EPDCCH to which DMRS relates.

A resource for the NZP CSI-RS is configured by the base station apparatus 10. The terminal apparatus 2A performs signal measurement (channel measurement), using NZP CSI-RS. A resource for the ZP CSI-RS is configured by the base station apparatus 10. With zero output, the base station apparatus 10 transmits the ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. MBSFN RS is used to demodulate PMCH. PMCH is transmitted on the antenna port used for transmission of MBSFN RS.

The downlink physical channels and the downlink physical signals are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword and coding processing or the like is performed for each codeword.

Figure 2:
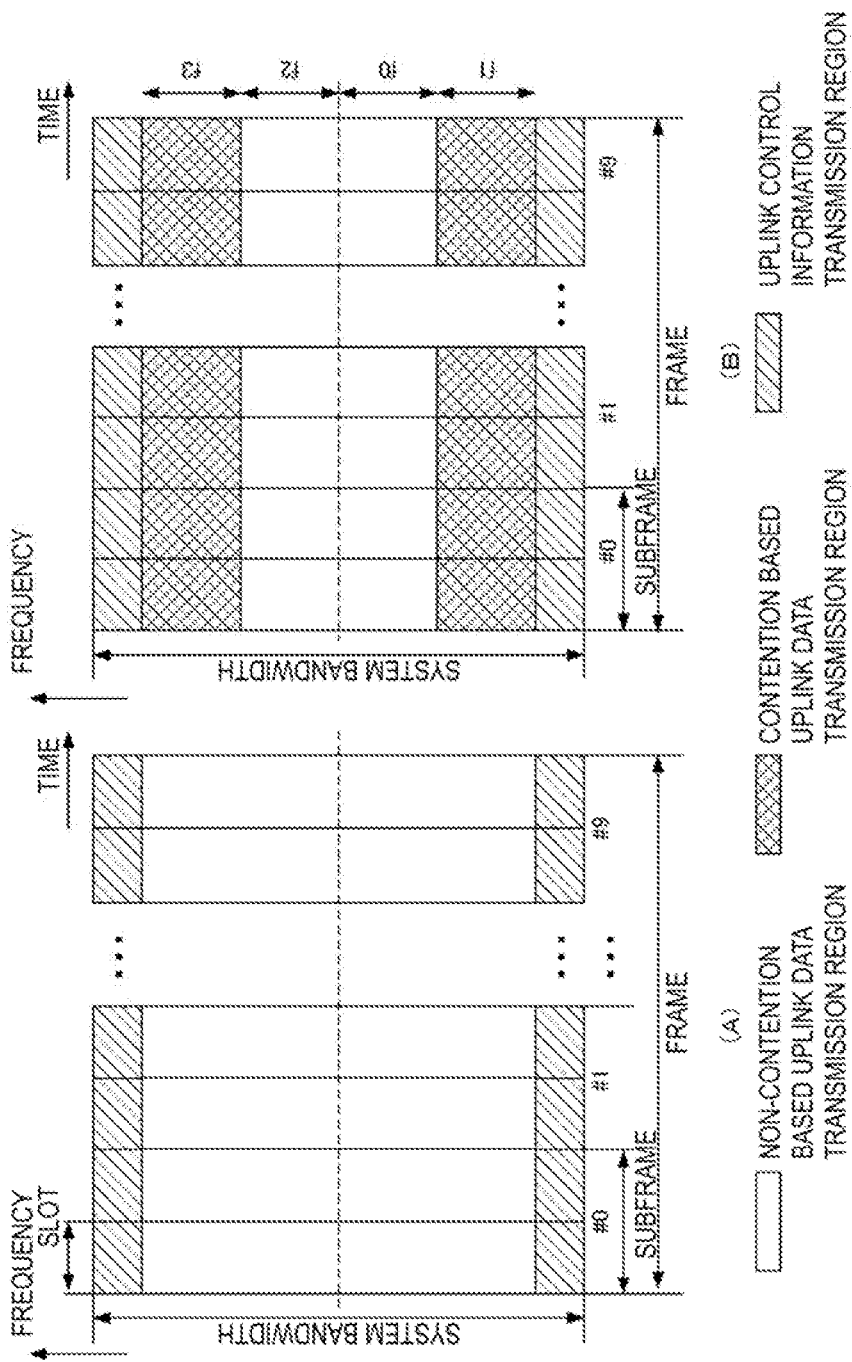
FIGS. 2A and 2B are diagrams illustrating examples of an uplink radio frame format according to the first embodiment.

FIGS. 2A and 2B are diagrams illustrating examples of an uplink radio frame format according to the present embodiment. FIG. 2A illustrates an example of a radio frame format in a case that the base station apparatus 10 configures to perform uplink data transmission only by non-contention based multiple access (for example, in a case that all the terminal apparatuses 20 and 30 in the cell 10a perform uplink transmission in a contention based manner). FIG. 2B illustrates an example of a radio frame format in a case that the base station apparatus 10 configures to perform uplink data transmission in a non-contention based manner and a contention based manner. In FIGS. 2A and 2B, a white portion is a region in which the non-contention based uplink data channel (for example, PUSCH) is transmitted (a region in which the terminal apparatus performs scheduled access) (also referred to as a non-contention based access region or a scheduled access region). A shaded portion is a region in which the contention based uplink data channel is transmitted (a region in which the terminal apparatus performs contention based access) (also referred to as a contention based access region). A rightward-ascending diagonal line portion is a region in which the uplink control channel (for example, PUCCH) is transmitted. Resources for allocating the PRACH and the reference signal (DMRS, SRS, or the like) are configured in prescribed symbols constituting the subframe (for example, the reference signals are configured in the fourth and 11th symbols). A frequency band (frequency resource) for allocating the reference signal can be assigned to each terminal apparatus. The frequency band (frequency resource) in which the reference signal is allocated can be configured so as to be the same as the frequency band to which the uplink data channel/the uplink control channel is assigned. The frequency band in which the reference signal is allocated can be configured so as to be the same as the frequency band to which the uplink data channel/the uplink control channel is assigned. The frequency band in which the reference signal is allocated can be configured so as to be wider than the frequency band to which the uplink data channel/the uplink control channel is assigned (It is not illustrated in FIGS. 2A and 2B for the sake of simplicity. Hereinafter, in the same manner, the reference signal or the like is omitted unless otherwise stated).

A system bandwidth is constituted of multiple subcarriers. The radio frame is constituted of multiple subframes (in FIGS. 2A and 2B, one radio frame includes ten subframes). One subframe is constituted of multiple slots (in FIGS. 2A and 2B, one subframe includes two slots). Furthermore, the subframe is constituted of multiple SC-FDMA symbols (corresponding to the OFDM symbol of downlink). A resource element is defined by one subcarrier and one SC-FDMA symbol. For example, in a subframe, in a case that the number of the subcarriers is 300 and the number of the SC-FDMA symbols is 14, in the contention based uplink data channel transmission region (shaded portion), the region is constituted of 4200 resource elements. Note that in the same manner, in FIGS. 3A to 3C to FIG. 7 illustrated below as well, each region will be described using a case of being constituted of the resource element.

FIG. 2B illustrates an example in which a region in which the uplink data channel is transmitted by the contention based multiple access (contention based access region) and a region in which the uplink data channel is transmitted by the non-contention based multiple access (non-contention based access region) are subjected to frequency division. A broken line indicates a center frequency. Here, f0 and f2 indicate a frequency bandwidth for the non-contention based transmission. Additionally, f1 and f3 indicate a frequency bandwidth for the contention based transmission. The base station apparatus 10 can configure separately a bandwidth of the non-contention based multiple access and a bandwidth of the contention based multiple access. The base station apparatus 10 may independently configure f0 to f3. The base station apparatus 10 can notify the terminal apparatus of the configuration of the bandwidths f0 to f3 using the DCI format/the RRC message/the system information/the broadcast channel/a contention based transmission configuration channel.

The base station apparatus 10 can notify the terminal apparatus of the radio frame format configuration using the DCI format/the RRC message/the system information/the broadcast channel/the contention based transmission configuration channel. The radio frame format configuration is an allocation configuration of the contention based transmission region and the non-contention based transmission region in the radio frame format. The base station apparatus 10 may notify the terminal apparatus of information indicating which format in FIG. 2A and FIG. 2B is applied using the DCI format/the RRC message/the system information/ the broadcast channel/the contention based transmission configuration channel. The base station apparatus 10 may notify of a cycle in which the radio format including the contention based transmission region is applied (for example, a frame unit) and a system frame number (SFN). Note that the bandwidth configuration can be included in the radio frame format.

In FIG. 2B, the terminal apparatus 20 transmits the uplink data channel, in accordance with the UL grant received from the base station apparatus 10, in the non-contention based uplink data channel transmission region (the white portion). The terminal apparatus 30 transmits the uplink data channel, in a case of receiving the UL grant from the base station apparatus 10, in accordance with the UL grant, in the non-contention based uplink data channel transmission region. The terminal apparatus 30 transmits the uplink data channel, in a case of not receiving the UL grant from the base station apparatus 10, or in a case of transmitting the data regardless of the UL Grant, in a contention based uplink data transmission region (shaded portion). In the contention based uplink data transmission region, at the same time and the same frequency, multiple terminal apparatuses simultaneously transmit the uplink data. Accordingly, the contention based uplink data transmission region is a region that allows a situation (non-orthogonal multiple access) in which the number of the transmission terminal apparatuses×the number of transmit antennas of each of the terminal apparatuses is equal to or more than the number of receive antennas of the base station apparatus.

Each of the terminal apparatuses 20 and 30 transmits, in a case of transmitting the uplink control channel to the base station apparatus 10, in the uplink control channel transmission region, the uplink control channel. In FIGS. 2A and 2B, in a case that the uplink control channel is transmitted in a contention based manner, the terminal apparatus 30 may transmit the uplink control channel in the contention based uplink data channel transmission region. The terminal apparatus 30 may configure, depending on a content of the UCI included in the uplink control channel (for example, which one of the SR, the CSI, and the ACK/NACK is included), whether the uplink control channel is transmitted in a contention based manner or in a non-contention based manner.

The base station apparatus 10 can notify the terminal apparatuses 20 and 30 of the control information indicating in which region the uplink data channel and the uplink control channel are transmitted using the DCI format/the RRC message/the system information/the broadcast channel/the contention based transmission configuration channel. For example, notification is performed indicating that the terminal apparatus 20-1 to the terminal apparatus 20-5 can transmit in the contention based transmission regions of odd-numbered subframes and the terminal apparatus 20-6 to the terminal apparatus 20-n can transmit in the contention based transmission regions of even-numbered subframes. In this case, the terminal apparatus 20-1 to the terminal apparatus 20-5 can transmit the uplink data by any resource in the contention based transmission regions of the odd-numbered subframes regardless of the UL Grant from the base station apparatus 10. In the same manner, the terminal apparatus 20-6 to the terminal apparatus 20-n can transmit the uplink data by any resource in the contention based transmission regions of the even-numbered subframes regardless of the UL Grant from the base station apparatus 10.

Figure 3:
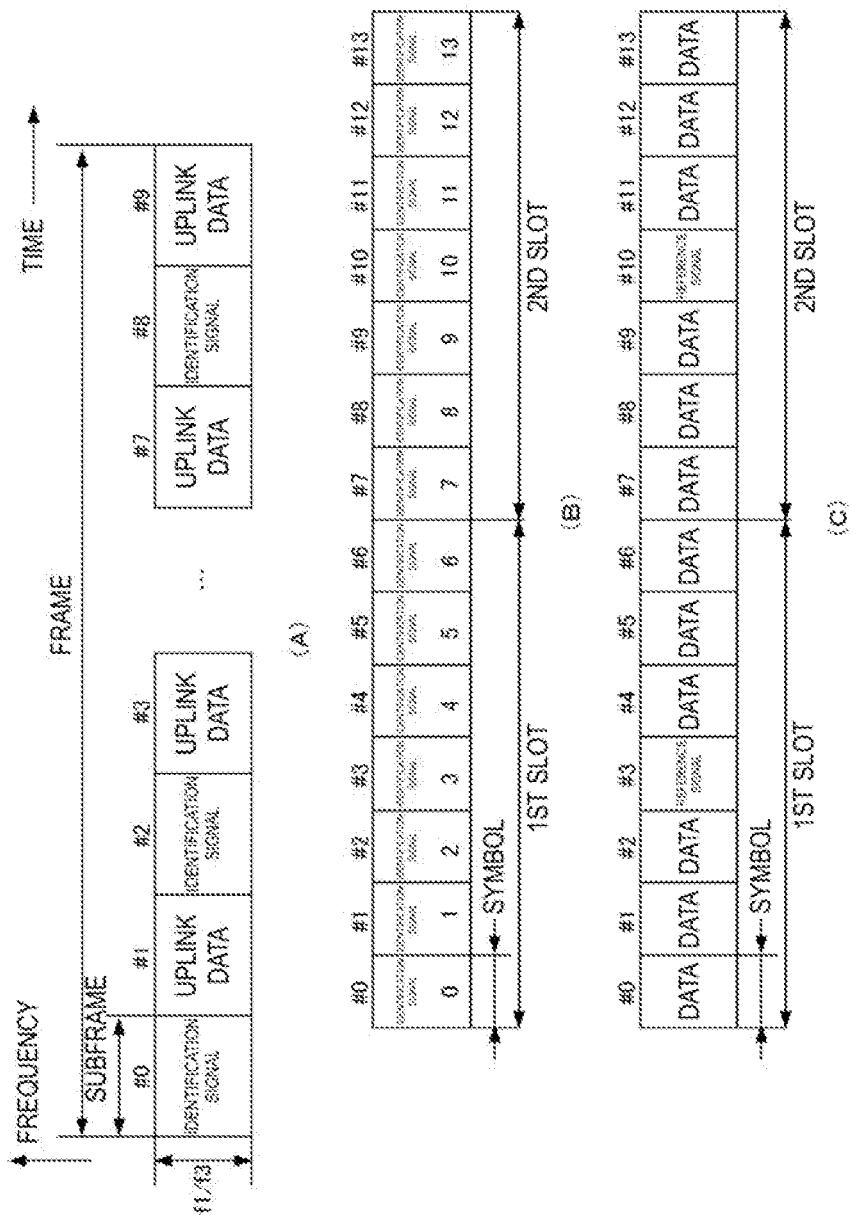
FIGS. 3A to 3C are diagrams illustrating a format example of an uplink subframe in contention based access according to the first embodiment.

FIGS. 3A to 3C are diagrams illustrating a format example of an uplink subframe in contention based access according to the present embodiment. For example, the format in FIGS. 3A to 3C is applied to the contention based uplink data channel region (shaded portion) in FIG. 2B. FIG. 3A illustrates a frame structure in the contention based transmission region. In FIG. 3A, even-numbered subframes (#0, #2, . . . , #8) are regions to which identification signals are assigned. Odd-numbered subframes (#1, #3, . . . , #9) are regions to which the uplink data channels are assigned. FIG. 3B illustrates a configuration of the subframe to which the identification signals are allocated. FIG. 3C illustrates a configuration of the subframe to which the uplink data are allocated. The subframe is constituted of multiple SC-FDMA symbols. For example, in FIG. 3B, each of the subframes is constituted of 14 SC-FDMA symbols. The identification signal is used for the base station apparatus to identify the terminal apparatus that has transmitted the uplink data.

For the identification signal, a known sequence determined beforehand in the base station apparatus and the terminal apparatus is used. For example, in FIG. 3B, as the identification signal, in a case that a different known sequence is assigned for each SC-FDMA symbol, 14 terminal apparatuses can be identified. Furthermore, a phase rotation and interleaving determined beforehand may be applied to the known sequence. The base station apparatus can identify the terminal apparatus by a known sequence pattern, a phase rotation pattern, an interleave pattern. With this, it is possible to increase the number of the terminal apparatuses that can be identified.

In FIG. 3C, the terminal apparatus assigns the uplink data in a subframe unit. The subframe to which the uplink data is assigned includes a reference signal (for example, SC-FDMA symbols #3 and #10 constituting an odd-numbered subframe). The reference signal is generated by multiplying the basic known sequence by any one of the identification signals 0 to 13. The base station apparatus performs channel estimation between the base station apparatus and the transmission terminal apparatus using the reference signal multiplied by the identification signal. The base station apparatus performs signal detection such as turbo equalization or the like of the uplink data using the channel estimate. Note that the known sequence can also serve as the reference signal in addition to the identification signal. In this case, the base station apparatus 10 performs the identification of the terminal apparatus and the channel estimation using the known sequence.

Figure 4:
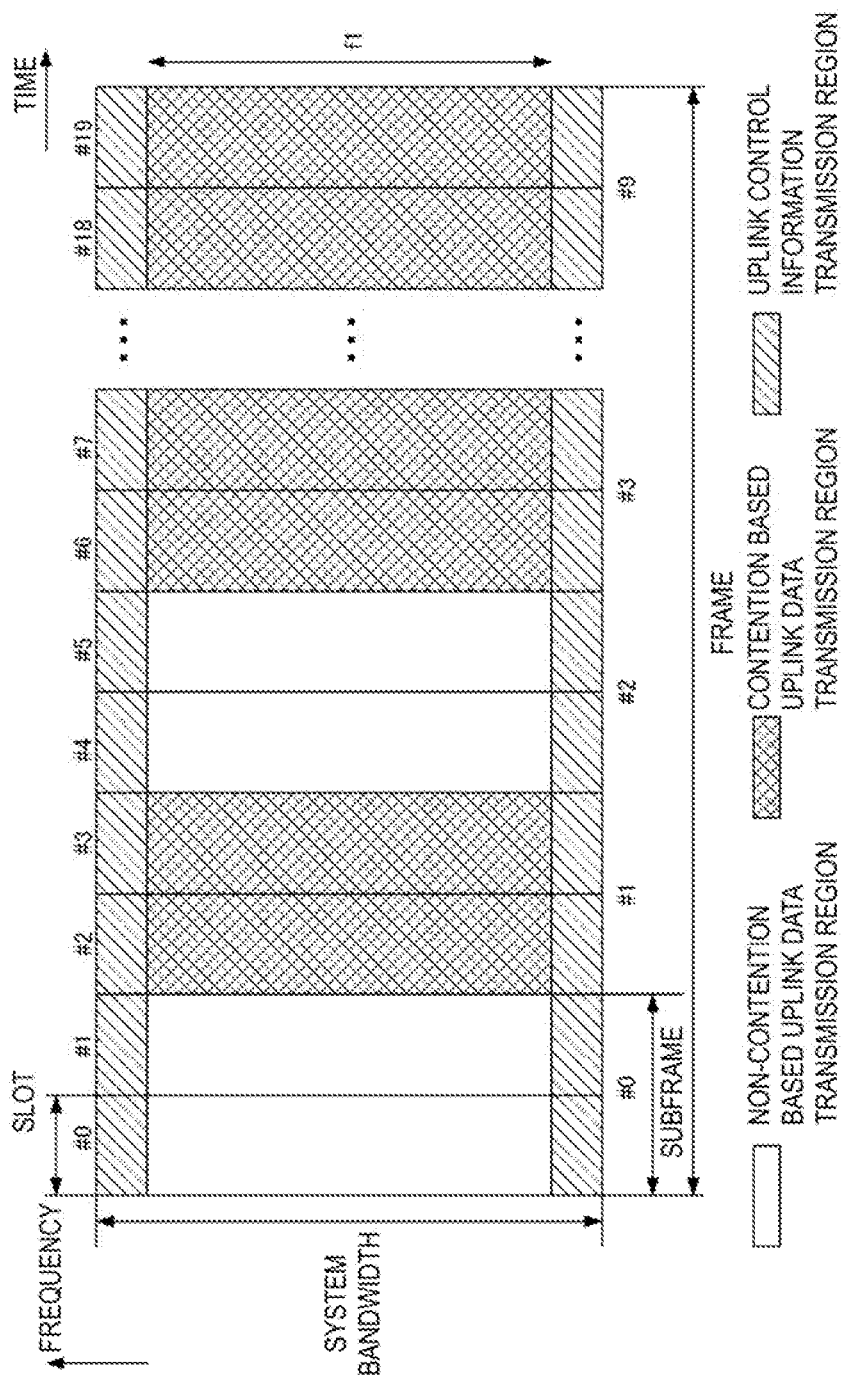
FIG. 4 is a diagram illustrating another example of the uplink radio frame format according to the first embodiment.

FIG. 4 is a diagram illustrating another example of the uplink radio frame format according to the present embodiment. In FIG. 4, a white portion is a region in which the non-contention based uplink data channel is transmitted. The shaded portion is a region in which the contention based uplink data channel is transmitted. A rightward-ascending diagonal line portion is a region in which the uplink control channel is transmitted. FIG. 4 illustrates an example in which a region in which the uplink data is transmitted in a contention based manner and a region in which the uplink data is transmitted in a non-contention based manner are subjected to time division. In FIG. 4, the non-contention based uplink data channel, the contention based uplink data channel, and the uplink control channel are transmitted using each region in the same manner as in FIGS. 2A and 2B. Note that in the same manner as in FIGS. 2A and 2B, in a case that the uplink control channel is transmitted in a contention based manner, the terminal apparatus 30 can transmit the uplink control channel in the contention based uplink data channel transmission region.

In the communication system according to the present embodiment, in addition to the non-contention based transmission subframe (also referred to as a normal subframe), the contention based transmission subframe can be defined. In FIG. 4, the subframes #1, #3, and #9 (the subframes with shaded portions) are subframes reserved for the contention based transmission. The base station apparatus 10 can transmit the control information for the contention based transmission subframe configuration using the DCI format/the RRC message/the system information/the broadcast channel/the contention based transmission configuration channel.

The control information for the contention based transmission subframe configuration includes the subframe number, the frequency band, or the like reserved for the contention base. Note that notification of the subframe that is reserved for the contention base may be performed using a bitmap.

In the communication system according to the present embodiment, the uplink control channel can be configured to be transmitted only in a non-contention based manner. In this case, regardless of whether the subframe is the non-contention based transmission subframe or the contention based transmission subframe, in the uplink control channel transmission region (rightward-ascending diagonal line portion), the uplink control channel is transmitted in a non-contention based manner.

In the communication system according to the present embodiment, the uplink control channel can also be configured to be transmitted in a non-contention based manner/contention based manner. In a case that the uplink control channel is transmitted in a contention based manner, the terminal apparatus 30 transmits the uplink control channel in the uplink control channel transmission region included in the transmission subframes for contention base (rightward-ascending diagonal line portion of the subframes #1, #3, and #9). On the other hand, the uplink control channel that is transmitted in a non-contention based manner is transmitted in the uplink control channel transmission region included in the subframes #0, #2, #4 to #8.

The communication system according to the present embodiment can configure, in accordance with a content of the UCI included in the uplink control channel, whether the transmission device 30 transmits the uplink control channel in a contention based manner or transmits it in a non-contention based manner. For example, in a case that the uplink control channel includes the ACK/NACK, the terminal apparatus 30 transmits the uplink control channel including the ACK/NACK in the uplink control channel transmission region in the transmission subframe for non-contention base. In a case that the uplink control channel is constituted of the SR, the terminal apparatus 30 can transmit the uplink control channel constituted of the SR in the non-contention based uplink control channel transmission region or the contention based uplink data channel transmission region. In a case that the uplink control channel includes the CSI, the terminal apparatus 30 transmits the uplink control channel including the CSI in the uplink control channel transmission region in the transmission subframe for non-contention base.

The communication system according to the present embodiment can also configure, in accordance with an attribute of the CSI, whether the transmission device 30 transmits the uplink control channel in a contention based manner or transmits it in a non-contention based manner. For example, in a case of an Aperiodic CSI, the terminal apparatus 30 can transmit the uplink control channel including the aperiodic CSI in the uplink control channel transmission region in the transmission subframe for non-contention base. In a case of a Periodic CSI, the terminal apparatus 30 can transmit the uplink control channel including the periodic CSI in the uplink control channel transmission region in the transmission subframes for non-contention base or the transmission subframes for contention base.

The communication system according to the present embodiment can also configure, in accordance with an uplink control information format, whether the transmission device 30 transmits the channel including the uplink control information in a contention based manner or transmits it in a non-contention based manner. The configuration in which manner the transmission is performed can be associated with a content of the control information included in the uplink control information format. For example, the uplink control information format constituted only of the SR can be transmitted in the uplink control channel transmission region of the transmission subframes for contention base. Note that the base station apparatus 10 may configure, in accordance with the number of bits of the uplink control channel, whether to transmit in the contention based region or to transmit in the non-contention based region. For example, in a case that the number of bits of the uplink control channel is less than the predetermined number, the uplink control channel is transmitted in the contention based transmission region. As described above, in accordance with the content of the uplink control information, it is configured whether the control information is transmitted in a contention based manner or transmitted in a non-contention based manner. With this, in accordance with importance/priority of the uplink control information, it can be configured which transmission method is used.

In FIG. 4, in a case that the region is configured in a subframe unit, the base station apparatus 10 configures the subframes #1, #3, and #9 as the contention based uplink data channel transmission region. In a case that the region is configured in a slot unit, the base station apparatus 10 configures the slots #2, #3, #6, #7, #18 and #19 as the contention based uplink data channel transmission region. Note that the base station apparatus 10 can notify the terminal apparatuses 20 and 30 of the control information indicating in which region the uplink data channel and the uplink control channel are transmitted using the DCI format/ the RRC message/the system information/the broadcast channel/the contention based transmission configuration channel.

Figure 5:
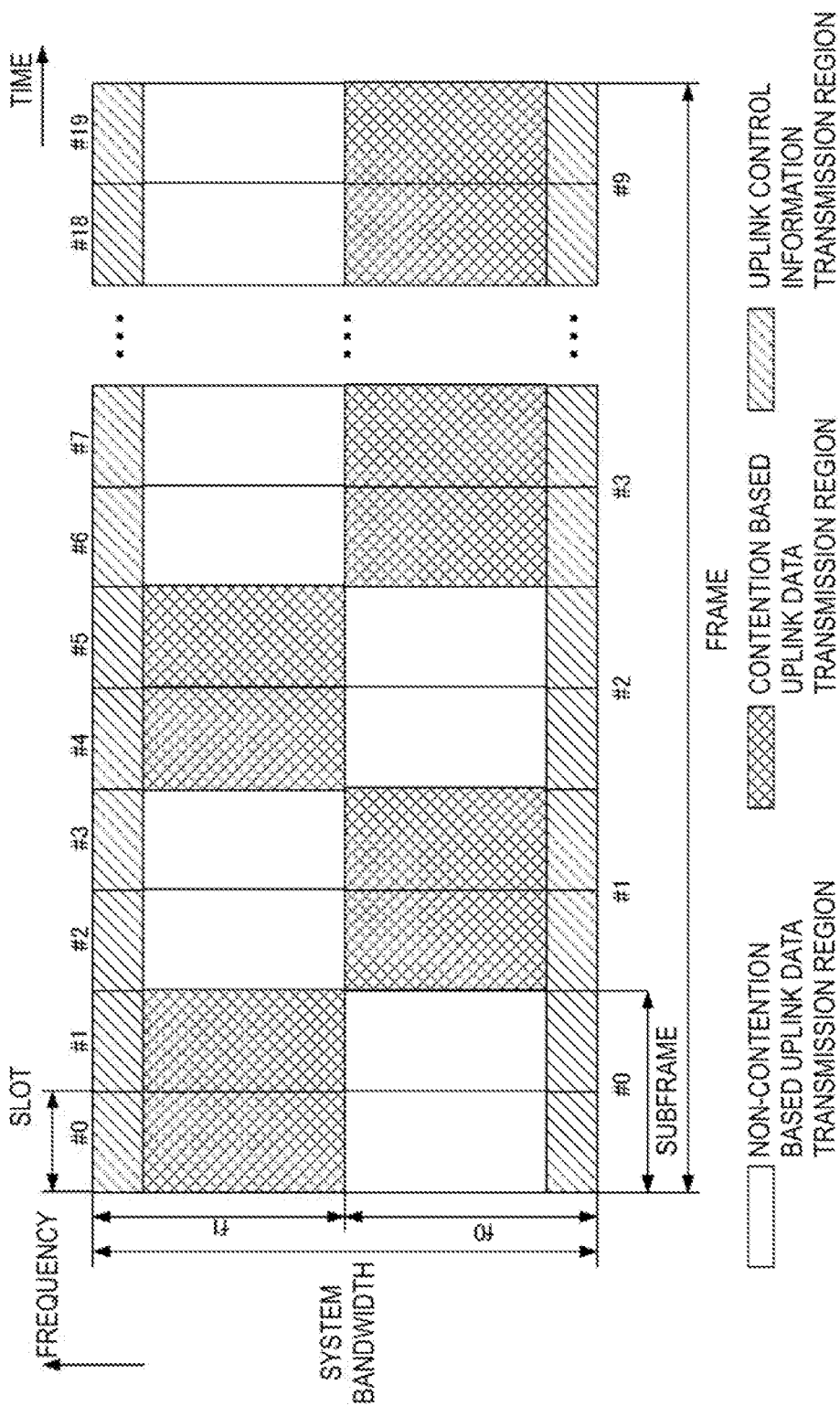
FIG. 5 is a diagram illustrating another example of the uplink radio frame format according to the first embodiment.

FIG. 5 is a diagram illustrating another example of the uplink radio frame format according to the present embodiment. FIG. 5 illustrates an example in which the contention based uplink data transmission region and the non-contention based uplink data transmission region are subjected to the frequency division and the time division. FIG. 5 illustrates a case that, in a subframe unit, the non-contention based transmission region and the contention based transmission region are alternately configured. Note that although the configuration is in a subframe unit in FIG. 5, the base station apparatus 10 can also alternately configure, in a slot unit, the non-contention based transmission region and the contention based transmission region. In FIG. 5, the non-contention based uplink data channel, the contention based uplink data channel, and the uplink control channel are transmitted using each region in the same manner as in FIGS. 2A and 2B and FIG. 4.

Figure 6:
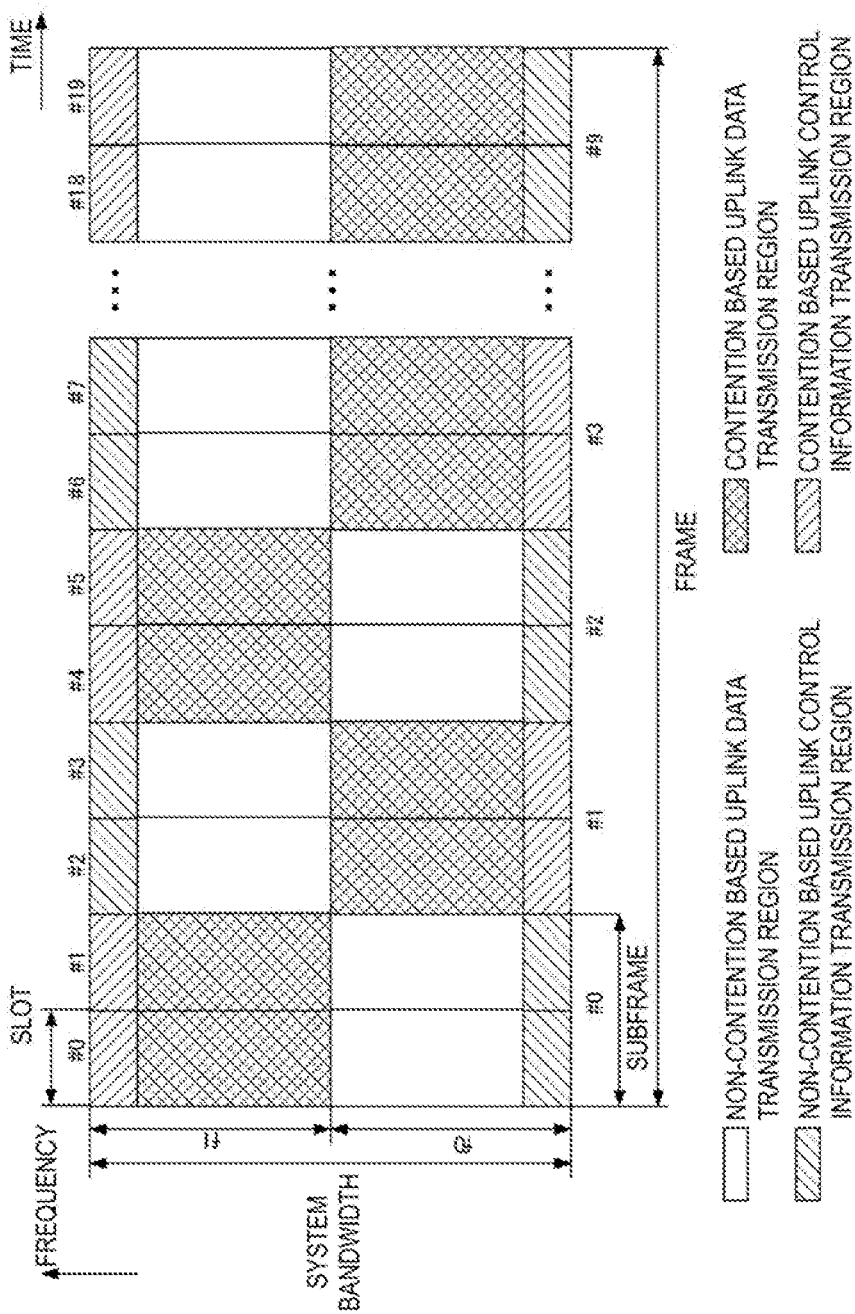
FIG. 6 is a diagram illustrating another example of the uplink radio frame format according to the first embodiment.

FIG. 6 is a diagram illustrating another example of the uplink radio frame format according to the present embodiment. In FIG. 6, a white portion is a region in which the non-contention based uplink data channel is transmitted. The shaded portion is a region in which the contention based uplink data channel is transmitted. A rightward-ascending diagonal line portion is a region in which the non-contention based uplink control channel is transmitted. A rightward-descending diagonal line portion is a region in which the contention based uplink control channel is transmitted. The non-contention based uplink control channel transmission region is a region in which the terminal apparatus transmits the uplink control channel based on the UL Grant of the base station apparatus. The contention based uplink control channel transmission region is a region in which the terminal apparatus can transmit the uplink control channel in a case that there is no UL Grant of the base station apparatus or regardless of the UL Grant.

The base station apparatus 10 can also associate the uplink control channel transmitted in a contention based manner with a region in which the contention based uplink data channel is transmitted. In FIG. 6, in a case that the subframe number is even, the contention based transmission region is in the frequency band f1 of the subframe. In a case that the subframe number is odd, the contention based transmission region is in the frequency band f0 of the subframe. In this case, the uplink control channel that is transmitted in a contention based manner is transmitted, in the subframe with the even subframe number, in the uplink control channel region included in the frequency domain f1. The uplink control channel that is transmitted in a contention based manner is transmitted, in the subframe with the odd subframe number, in the uplink control channel region included in the frequency domain f0. On the other hand, the uplink control channel that is transmitted in a non-contention based manner is transmitted, in the subframe with the even subframe number, in the uplink control channel region included in the frequency domain f0. The uplink control channel that is transmitted in a non-contention based manner is transmitted, in the subframe with the odd subframe number, in the uplink control channel region included in the frequency domain f1.

The terminal apparatuses 20 and 30 transmit the uplink data channel, in accordance with the UL grant received from the base station apparatus 10, in the non-contention based uplink data channel transmission region. The terminal apparatus 30 transmits the uplink data channel, in a case of not receiving the UL grant received from the base station apparatus 10, or in a case of performing data transmission regardless of the UL Grant, in the contention based uplink data transmission region. The base station apparatus 10 can configure, in accordance with a content of the uplink control information included in the uplink control channel, whether the uplink control channel is transmitted in a non-contention based manner or a contention based manner. For example, depending on by which combination of the ACK/NACK, the CSI, and the SR the UCI being constituted and included in the uplink control channel, it is determined whether the uplink control channel is transmitted in the non-contention based region or the contention based region.

For example, in a case that the UCI includes only the SR, the terminal apparatus 30 transmits the uplink control channel in the contention based uplink control channel transmission region. In a case that the UCI includes at least the ACK/NACK (for example, the UCI constituted of the ACK/ NACK and the SR), the terminal apparatus 30 transmits the uplink control channel in the non-contention based uplink control channel transmission region. In a case that the UCI includes at least the CSI (for example, the UCI constituted of the CSI and the SR), the terminal apparatus 30 transmits the uplink control channel in the non-contention based uplink control channel transmission region. The base station apparatus 10 may configure, in accordance with the USI format, whether the uplink control channel is transmitted in the non-contention based region or the contention based region.

In the communication system according to the present embodiment, a non-contention based C-RNTI and a contention based C-RNTI can be defined. The base station apparatus 10 scrambles the downlink control channel/a downlink data channel by the non-contention based C-RNTI or the contention based C-RNTI. The terminal apparatus 30 can determine, by the C-RNTI in which the downlink control channel/the downlink data channel is scrambled, a region for transmitting the uplink data channel/the uplink control channel. For example, the terminal apparatus 30 determines, by the C-RNTI by which the downlink control channel/the downlink data channel is scrambled, a region for transmitting the ACK/NACK with respect to the downlink data channel. The terminal apparatus 30 transmits, in a case that the downlink control channel/the downlink data channel is scrambled by the contention based C-RNTI, the ACK/NACK with the contention based C-RNTI.

Figure 7:
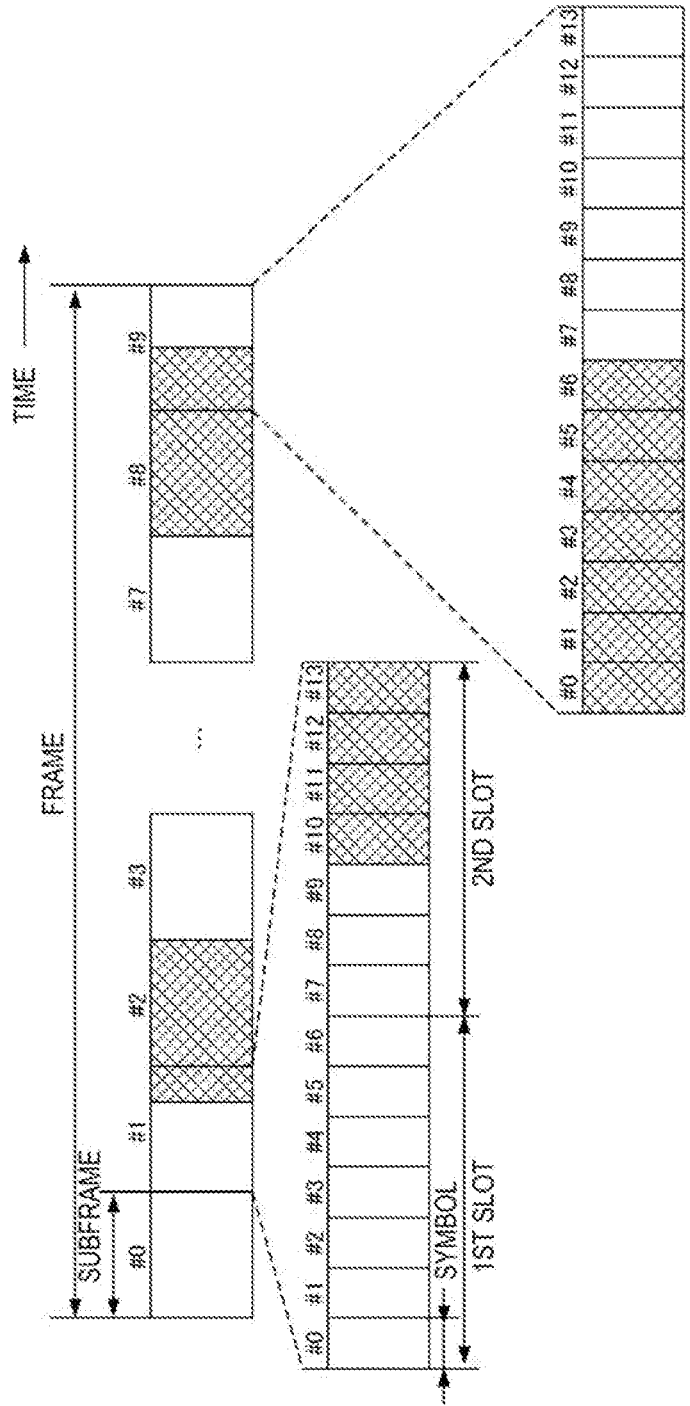
FIG. 7 is a diagram illustrating another example of the uplink radio frame format according to the first embodiment.

FIG. 7 is a diagram illustrating another example of the uplink radio frame format according to the present embodiment. In the example of FIG. 7, one radio frame is constituted of ten subframes. One subframe is constituted of two slots. One slot is constituted of seven symbols (SC-FDMA symbol or OFDM symbol). In other words, the one subframes is constituted of 14 symbols. In FIG. 7, a white portion is a region in which the non-contention based uplink data channel is transmitted. The shaded portion is a region in which the contention based uplink data channel is transmitted.

The base station apparatus 10 can configure the transmission region for contention base in a symbol unit. In FIG. 7, among the symbols constituting the subframe #1, four symbols are configured as the transmission regions for contention base. In the subframes #2 and #8, all the symbols constituting the subframe are configured as the transmission regions for contention base. Among the symbols constituting the subframe #9, seven symbols are configured as the transmission regions for contention base.

In the communication system according to the present embodiment, the base station apparatus/terminal apparatus may recognize that, in a case that a certain subframe (the subframe #2 in FIG. 7) is configured as the transmission subframe for contention base, a part of the previous subframe thereof (the subframe #1 in FIG. 7) is a transmittable region in a contention based manner (referred to as a transmittable pre-region in a contention based manner). The base station apparatus 10 can notify the terminal apparatus 30 of the transmittable pre-region in a contention based manner using the DCI format/the RRC message/the system information/the broadcast channel/the contention based transmission configuration channel in a subframe unit/a slot unit/a symbol unit. For example, in FIG. 7, the base station apparatus 10 notifies of the subframe number #2 as the transmission subframe for contention base and the number four of the symbols as the transmittable pre-regions in a contention based manner. In the base station apparatus 10, for the terminal apparatus 30, the symbols #10 to #13 constituting the subframe #1 and all the symbol constituting the subframe #2 are candidate regions for the contention based data transmission.

In the communication system according to the present embodiment, the base station apparatus/terminal apparatus may recognize that, in a case that a certain subframe (the subframe #8 in FIG. 7) is configured as the transmission subframe for contention base, a part of the following subframe thereof (the subframe #9 in FIG. 7) is a transmittable region in a contention based manner (referred to as a transmittable post-region in a contention based manner). The base station apparatus 10 can notify the terminal apparatus 30 of the transmittable post-region in a contention based manner using the DCI format/the RRC message/the system information/the broadcast channel/the contention based transmission configuration channel in a subframe unit/a slot unit/a symbol unit. In FIG. 7, the base station apparatus 10 notifies of the subframe number #8 as the transmission subframe for contention base and the number seven of the symbols (the number 1 of the slots) as the transmittable pre-regions in a contention based manner. For the terminal apparatus 30, all the symbol constituting the subframe #8 and the symbols #0 to #6 constituting the subframe #9 are candidate regions for the contention based data transmission.

The base station apparatus 10 can notify the terminal apparatuses 20 and 30 of the control information indicating the contention based transmission region using the DCI/the RRC message/the system information/the broadcast channel/the contention based transmission configuration channel. The base station apparatus 10 can notify of the control information indicating the contention based transmission region in a subframe unit/a slot unit/a symbol unit. For example, in FIG. 4, the base station apparatus 10 notifies the terminal apparatus of the contention based transmission subframe numbers #1, #3, and #9. The base station apparatus 10 may notify the terminal apparatus of the contention based transmission slot numbers #2, #3, #6, #7, #18, and #19.

The base station apparatus 10 can also notify the terminal apparatus of the contention based transmission subframe/slot/symbol using a bitmap (for example, "0" represents the non-contention based subframe, "1" represents the contention based subframe). For example, in FIG. 4, in a case that the notification is performed in a subframe unit, the base station apparatus 10 notifies the terminal apparatus of Contentionbasedsubframe={0, 1, 0, 1, 0, 0, 0, 0, 0, 1} using the RRC message. Note that each element of the Contentionbasedsubframe is made to correspond to the subframe number.

The base station apparatus 10 can also notify the terminal apparatus of the region in which the contention based transmission is performed using a start timing at which the contention based transmission is performed and a continuous transmission interval. The base station apparatus 10 can notify of the subframe/the slot/the symbol in which the contention based transmission is performed as the start timing. The base station apparatus 10 can notify of the number of the subframes/the number of the slots/the number of the symbols in which the contention based transmission is performed as the continuous transmission interval. For example, in FIG. 4, in a case of notifying in a slot unit, the base station apparatus 10 transmits the slot numbers #2, #6, and #18 as the start slot. The base station apparatus 10 transmits two as the number of slots that are continuously transmitted. Note that the notification of the continuous transmission interval may be performed for each start point.

The base station apparatus 10 can also notify the terminal apparatus of a cycle of the region in which the contention based transmission is performed. For example, in FIG. 5, the base station apparatus 10 notifies the terminal apparatus of "1" as the subframe cycle of the region in which the contention based transmission is performed using the DCI/the RRC message/the system information/the broadcast channel/the contention based transmission configuration channel. Note that the base station apparatus 10 can also notify of which one of the even-numbered subframe and the odd-numbered subframe to be configured as the subframe that performs the contention based transmission.

In the communication system according to the present embodiment, in the Time Division Duplex (TDD), by a combination of the bitmap and an uplink-downlink subframe constitution configuration (UL-DL subframe configuration, a configuration indicating whether the subframes constituting the radio frame are uplink or downlink), the contention based uplink transmission subframe and the contention based downlink transmission subframe can be configured.

In the communication system according to the present embodiment, in the uplink-downlink subframe constitution configuration of the time division duplex, the contention based transmitting subframe can be configured. The uplink-downlink subframe constitution configuration is constituted of a combination of the non-contention based uplink subframe, the non-contention based downlink subframe, a contention based transmission transmitting subframe, and a special subframe. The uplink-downlink subframe constitution configuration is constituted of a combination of the non-contention based uplink subframe, the non-contention based downlink subframe, the contention based uplink subframe, the contention based downlink subframe, and the special subframe. The special subframe is a subframe allocated between the downlink subframe and the uplink subframe, and includes a DwPTS field, a GP field, and an UpPTS field. The communication system according to the present embodiment can configure the special subframe as a subframe that prohibits the contention based transmission.

In the communication system according to the present embodiment, the base station apparatus 10 can notify the terminal apparatus of whether the contention based transmission is supported. The base station apparatus 10 that supports the contention based transmission can also notify the terminal apparatus of a setup and release of the contention based transmission. The base station apparatus 10 may notify of the presence or absence of the support of the contention based transmission/the setup/the release of the contention based transmission by transmitting the bitmap indicating the contention based transmission subframe. The base station apparatus 10 can notify the terminal apparatus of the presence or absence of the support of the contention based transmission/the setup/the release of the contention based transmission using the DCI format/the RRC message/the system information/the broadcast channel/the contention based transmission configuration channel. Additionally, the terminal apparatus can receive a function that the base station apparatus 10 supports and select a cell to be connected. For example, the terminal apparatus that desires to perform the contention based transmission can perform a connectivity request to a base station apparatus with the highest reception power among the base station apparatuses that support the contention based transmission.

The Carrier Aggregation (CA) in which broadband transmission is performed by combining multiple Component Carriers (CCs) can be applied to the base station apparatus 10. In this case, the base station apparatus can independently configure the frame format in a Primary Cell (PCell) and/or a Secondary Cell (SCell). The base station apparatus can transmit the uplink data channel in a contention based manner in the Pcell, and transmit the uplink data channel in a non-contention based manner in the Scell.

In a case that the contention based uplink data transmission is configured, the configuration of the base station apparatus 10 may be such that the carrier aggregation is not applied. The base station apparatus 10 can also configure so as not to assign the uplink data in the subframe of the Scell that is transmitted at the same timing as that of the subframe in which the uplink data signal is transmitted in a contention based manner in the Pcell. The base station apparatus 10 may also configure the number of the component carriers in which the contention based transmission can be performed in accordance with the number of the terminal apparatuses that perform the contention based transmission. Note that these configurations may be replaced with each other between the Pcell and the Scell.

Figure 8:
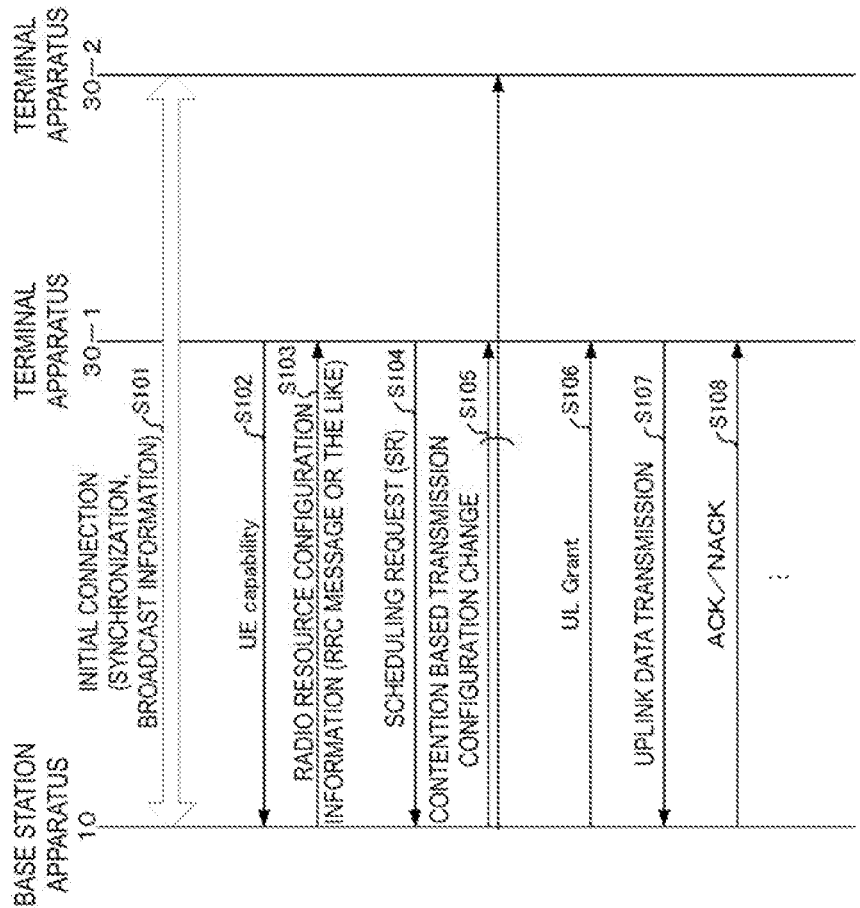
FIG. 8 is a diagram illustrating a sequence example of an uplink transmission in non-contention based access according to the first embodiment.

FIG. 8 is a diagram illustrating a sequence example of an uplink transmission in the non-contention based access according to the present embodiment. The base station apparatus 10 periodically transmits a synchronization signal, a broadcast channel, and the like in the downlink using a prescribed subframe. The terminal apparatus 30-1 performs initial connection (including handover) using the synchronization signal, the broadcast channel, and the like (S101). The terminal apparatus performs frame synchronization and symbol synchronization using the synchronization signal. Furthermore, the terminal apparatus specifies a cell ID, the system bandwidth, the SFN, and the like by the broadcast channel. The broadcast channel can include configuration information for the contention based transmission. In this case, the terminal apparatus specifies the configuration relating to the contention based transmission in the connected cell. The configuration information for the contention based transmission can include information indicating that the contention based transmission is supported, information relating to the radio frame format, control information for the contention based transmission, information relating to terminal apparatus identification (information relating to an identification signal), and the like. Note that the base station apparatus 10 performs the initial connection to the terminal apparatuses 20 and 30 as well.

The terminal apparatus 30-1 transmits UE Capablity (S102). The base station apparatus can specify whether the terminal apparatus supports the contention based transmission using the UE Capablity. For example, the UE Capblity is transmitted using the RRC message or the like. The base station apparatus transmits configuration information relating to the radio resource control to the terminal apparatus (S103). The configuration information relating to the radio resource control can include a part or all of the configuration information for the contention based transmission. Note that the terminal apparatuses 20 and 30 also perform the processing of S102 and S103 for the base station apparatus 10.

The configuration information relating to the radio resource control can include the configuration information for the contention based transmission in addition to the configuration information for the non-contention based transmission. The configuration information for the radio resource control is transmitted using the RRC message or the like. The terminal apparatus transmits, in order to transmit the uplink data in a non-contention based manner, a scheduling request (SR), a buffer status report (BSR), and the like (S104). The base station apparatus assigns the radio resource for the uplink data transmission to each terminal apparatus while taking the BSR or the like into consideration.

Here, it is assumed that the base station apparatus configures the format in FIG. 2B including the contention based transmission region as the uplink radio frame format. In this format configuration, in a case that the radio resource assignment for the uplink data transmission exceeds the non-contention based transmission region (for example, a case that the radio resources are assigned across the bandwidths f0 to f3), the base station apparatus transmits a contention based transmission configuration change notification (S105). The base station apparatus 10 can broadcast the contention based transmission prohibition to the terminal apparatus connecting to the cell. The base station apparatus 10 may transmit the contention based transmission prohibition to the terminal apparatus that receives the transmission grant in the target contention based transmission region. The contention based transmission configuration change can be information indicating that the subframe including the radio resource assignment is a subframe of the contention based transmission prohibition. The contention based transmission configuration change may be information for the subframe including the radio resource assignment to release the contention based transmission. The contention based transmission configuration change may be bandwidths after the change (f0 to f3 after the change) in the subframe including the radio resource assignment. For the contention based transmission configuration change, the DCI/the RRC message/the system information/the contention based transmission configuration channel or the like can be used.

The base station apparatus transmits the uplink transmission grant (UL Grant) to the terminal apparatus using the DCI (S106). The terminal apparatus transmits, based on an uplink transmission parameter included in the UL Grant, the uplink data by a prescribed radio resource (S107). The base station apparatus transmits the ACK/NACK for the uplink data (S107). As described above, it is possible to avoid a situation in which the radio resource assigned for the non-contention based transmission overlaps with the contention based transmission region. Accordingly, it is possible to avoid interference due to a collision between the contention based transmission and the non-contention based transmission.

Note that in the same manner, even in a case that the radio frame formats in FIG. 4 to FIG. 7 are configured, the base station apparatus can control the contention based transmission region. For example, the uplink data transmission is performed 4 ms after receiving the UL Grant (in a case that one subframe period is 1 ms, the uplink data is transmitted four subframes after the subframe that has received the UL Grant). In a case that the uplink data transmission assigned by this UL Grant is the subframe for non-contention based transmission (for example, in FIG. 4, a case that the UL Grant is transmitted four subframes before the subframe #1), the base station apparatus transmits the contention based transmission configuration change.

Figure 9:
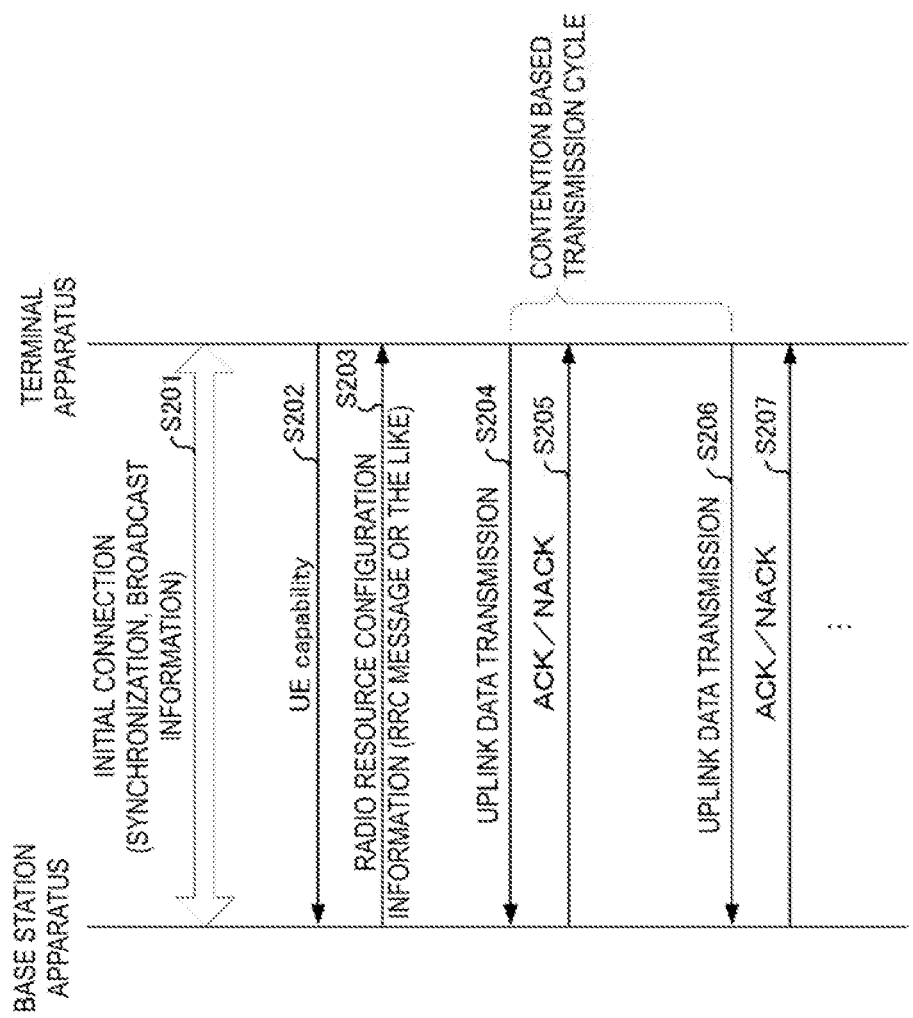
FIG. 9 is a diagram illustrating a sequence example of an uplink transmission in contention based access according to the first embodiment.

FIG. 9 is a diagram illustrating a sequence example of an uplink transmission in the contention based access according to the present embodiment. The base station apparatus 10 periodically transmits a synchronization signal, a broadcast channel, and the like in the downlink using a prescribed subframe. The terminal apparatus performs initial connection using the synchronization signal, the broadcast channel, and the like (S201). The terminal apparatus performs frame synchronization and symbol synchronization using the synchronization signal. Furthermore, the terminal apparatus specifies a cell ID, the system bandwidth, the SFN, and the like by the broadcast channel. In a case that configuration information for the contention based transmission is included in the broadcast channel, the terminal apparatus specifies the configuration relating to the contention based transmission in the connected cell.

The terminal apparatus transmits UE Capability (S202). The base station apparatus can specify whether the terminal apparatus supports the contention based transmission using the UE Capability. For example, the UE Capbility is transmitted using the RRC message or the like. The base station apparatus transmits configuration information relating to the radio resource control to the terminal apparatus (S203). The configuration information relating to the radio resource control can include the control information for the contention based transmission. The configuration information for the radio resource control is transmitted using the RRC message or the like. Each terminal apparatus specifies, using the configuration information for the contention based transmission, the configuration information for the radio resource control, and the like, a transmittable region in a contention based manner, a cycle for the contention based transmission, an identification signal assigned for the contention based transmission, and the like.

The terminal apparatus that supports the contention base can transmit, in a case that the uplink transmission data occurs, the uplink data by an arbitrary radio resource in the contention based transmission region, using the identification signal given to itself (S204). The base station apparatus transmits the ACK/NACK for the uplink data (S205). In S204, the terminal apparatus that supports the contention base may transmit the uplink control information by an arbitrary radio resource in the contention based transmission region. Here, the radio resource by which the uplink control information is transmitted may be determined in accordance with the content thereof.

For example, the ACK/NACK is transmitted 4 ms after receiving the downlink data (in a case that one subframe period is 1 ms, the ACK/NACK is transmitted four subframes after the subframe that has received the downlink data). In FIG. 6, in a case that the downlink data is received four subframes before the subframe #0, the uplink control information including the ACK/NACK is transmitted in the subframe #0. In this case, the uplink control information including the ACK/NACK is transmitted in a contention based manner in the uplink control information transmission region (rightward-ascending diagonal line portion) of the subframe #0. On the other hand, in a case that the uplink control information not including the ACK/NACK is transmitted in the subframe #0, the uplink control information can be transmitted in a contention based manner in the contention based transmission region (shaded portion).

In the same manner, in a case that the uplink data to be transmitted occurs, regardless of the UL Grant, in the contention based transmission region, the base station apparatus transmits the uplink data (S206, S207). Here, in a case that a cycle in which the contention based transmission can be performed is configured in the control information for the contention base, the terminal apparatus transmits the uplink data based on the cycle.

Figure 10:
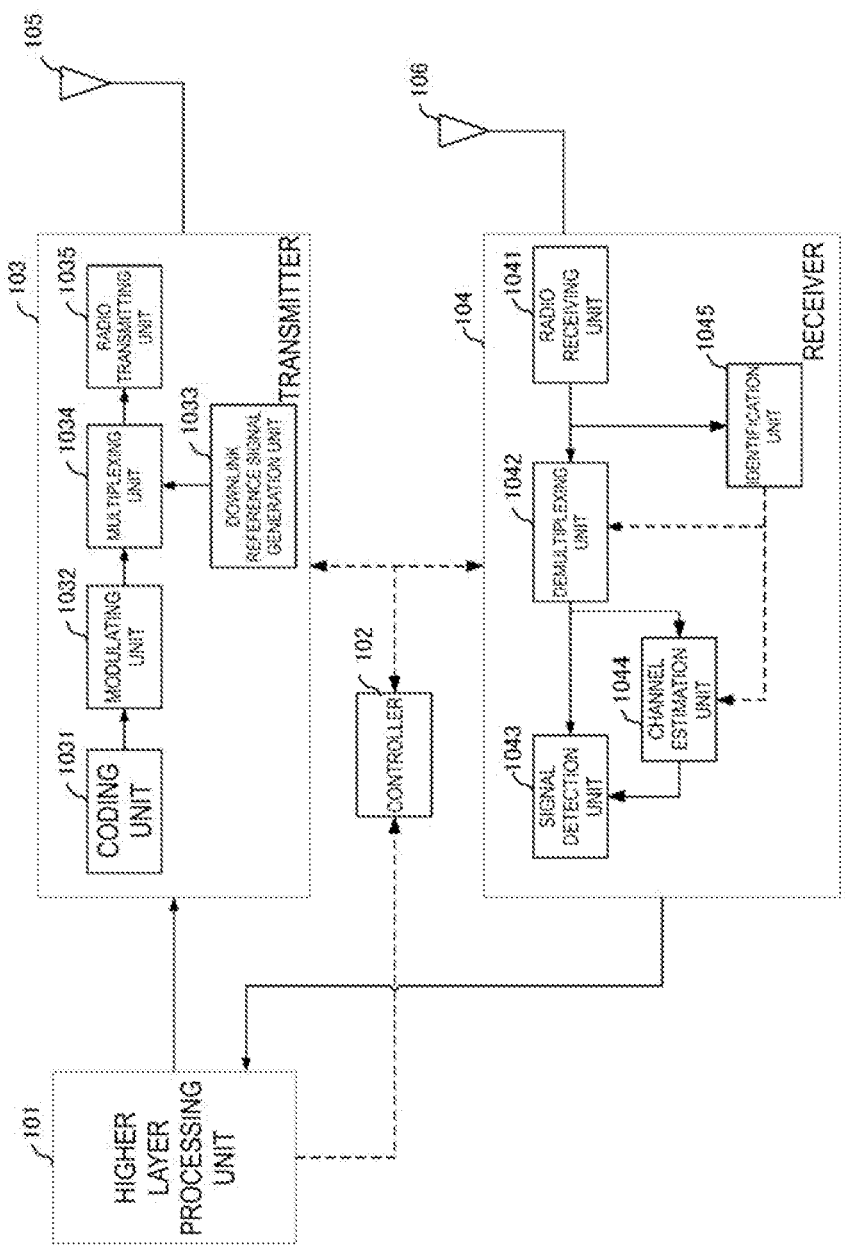
FIG. 10 is a schematic block diagram illustrating a configuration of a base station apparatus according to the first embodiment.

FIG. 10 is a schematic block diagram illustrating a configuration of the base station apparatus 10 according to the present embodiment. The base station apparatus 10 is configured, including a higher layer processing unit (higher layer processing step) 101, a controller (controlling step) 102, a transmitter (transmitting step) 103, a receiver (receiving step) 104, a transmit antenna 105, and a receive antenna 106. The transmitter 103 generates a transmit signal (downlink channel) to the terminal apparatuses 20 and 30 in accordance with a logical channel input from the higher layer processing unit 101. The transmitter 103 is configured, including a coding unit (coding step) 1031, a modulating unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 is configured, including a radio receiving unit (radio receiving step) 1041, a demultiplexing unit (demultiplexing step) 1042, a signal detection unit (signal detecting step) 1043, a channel estimation unit (channel estimating step) 1044, and an identification unit (identifying step) 1045.

The higher layer processing unit 101 performs processing of a higher layer than physical layers such as the Medium Access Control (MAC) layer, the Packet Data Convergence Protocol (PDCP) layer, the Radio Link Control (RLC) layer, the Radio Resource Control (RRC) layer, and the like. The higher layer processing unit 101 generates information necessary for control of the transmitter 103 and the receiver 104, and outputs the generated information to the controller 102. The higher layer processing unit 101 outputs the uplink data (for example, DL-SCH) and the broadcast information (for example, BCH) to the transmitter 103.

The higher layer processing unit 101 receives information of a terminal apparatus, such as UE capability or the like, from the terminal apparatuses 20 and 30 (through the receiver 104). To rephrase, the terminal apparatus transmits its function to the base station apparatus by higher layer signaling. Information of a terminal apparatus includes information indicating whether the stated terminal apparatus supports a prescribed function, or information indicating that the stated terminal apparatus has completed the introduction and test of a prescribed function. The information of whether the prescribed function is supported includes the information of whether the introduction and test of the prescribed function have been completed.

For example, in a case where a terminal apparatus supports a prescribed function, the stated terminal apparatus transmits information (parameters) indicating whether the prescribed function is supported. In a case where a terminal apparatus does not support a prescribed function, the stated terminal apparatus may not transmit the information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

The information relating to the terminal apparatus includes information indicating that the contention based transmission is supported and information indicating that the carrier aggregation is supported (information indicating the number of component carriers for which the aggregation can be performed may be included). In a case where multiple functions compatible with the contention based transmission are present, the terminal apparatus can transmit information indicating whether the functions are supported on a function-by-function basis. The functions compatible with the contention based transmission are part of or all of capability compatible with multiple tables indicating antenna ports, scrambling identities and the number of layers, capability compatible with a prescribed number of antenna ports, capability compatible with the number of component carriers of Carrier Aggregation, the number of resource blocks and the like, and capability compatible with a prescribed transmission mode. The transmission mode is determined by the number of the antenna ports, transmission diversity, the number of layers, or the like. The capability compatible with a prescribed transmission mode can include, for example, that the contention based transmission in the FDD format can be handled, that the contention based transmission in the TDD format can be handled, or the like. For example, in a case that there are multiple FDD/TDD formats, the terminal apparatus can also transmit information indicating which FDD/TDD format is supported as information relating to the terminal apparatus.

The higher layer processing unit 101 generates, or acquires from a higher node, the downlink data (the transport block) allocated in the downlink PDSCH, system information, the RRC message, the MAC Control Element (CE), and the like. The higher layer processing unit 101 outputs the downlink data to the transmitter 103. The higher layer processing unit 101 manages various pieces of configuration information of the terminal apparatuses 20 and 30. The higher layer processing unit 101 determines, for the terminal apparatuses supporting the contention based transmission, assignment of the contention based transmission region in which each terminal apparatus is allowed to transmit and assignment of the identification signal to each terminal apparatus. Information relating to the assignment of the contention based transmission region and the assignment of the identification signal to each terminal apparatus can be included in the various pieces of configuration information. Note that a part of the function of the radio resource control may be performed in the MAC layer, the physical layer, or the like.

The higher layer processing unit 101 configures the Cell Radio Network Temporary Identifier (C-RNTI) for each terminal apparatus. The cell radio network temporary identifier includes an identifier specific to the contention base. The C-RNTI is used for encryption (scrambling) of the downlink control channel and the downlink data channel in the non-contention based transmission. The C-RNTI can be used for encryption (scrambling) of the identification signal, the uplink data channel, and the uplink control channel in the contention based transmission. The identifier specific to the contention base can be used for identification of the terminal apparatus.

The various pieces of configuration information include the configuration information relating to the contention based transmission. The information relating to the contention based transmission can include the information relating to the assignment of the contention based transmission region and the assignment of the identification signal to each terminal apparatus. The configuration information relating to the contention based transmission can include a configuration of the contention based transmission region, a configuration of the identifier specific to the contention base, and a parameter indicating the setup and release of the contention base. The information relating to the contention based transmission may include a parameter indicating a cycle in the contention based transmission (transmission interval). The information relating to the contention based transmission may include information indicating the contention based transmission subframe. The information relating to the contention based transmission may include information indicating the contention based transmission configuration change (contention based transmission prohibition notification).

The higher layer processing unit 101 transmits various pieces of configuration information, such as information indicating that the base station apparatus 10 supports the contention based transmission, configuration information relating to the contention based transmission (also referred to as contention based transmission configuration assist information), or the like, to the terminal apparatus through the transmitter 103. The configuration information relating to the contention based transmission can be included in an individual radio resource configuration parameter (for example, RadioResourceConfigDedicated of LTE-A). The information relating to the contention based transmission can also be included in a cell specific radio resource configuration parameter. The information relating to the contention based transmission may be defined as the radio resource parameter specific to the contention based transmission.

The higher layer processing unit 101 determines, in the non-contention based transmission, while taking the contention based transmission subframe into consideration, frequency and time resources (subcarrier and subframe) to which the physical channels (PDSCH and PUSCH) to be transmitted to each terminal apparatus are assigned. The higher layer processing unit 101 determines a coding rate and a modulation scheme (or MCS) for the physical channels (PDSCH and PUSCH), the transmit power, and the like. The higher layer processing unit 101 generates the information to be used for the scheduling of the physical channels (PDSCH and PUSCH) for the non-contention base, based on the result of the scheduling. The higher layer processing unit 101 outputs the generated information to the controller 102. The higher layer processing unit 101 outputs a part or all of the configuration information relating to the contention based transmission to the controller 102.

Based on the various pieces of configuration information input from the higher layer processing unit 101, the controller 102 generates a control signal for controlling of the transmitter 103 and the receiver 104. The controller 102 generates the downlink control information (DCI) based on the information input from the higher layer processing unit 101, and outputs the generated information to the transmitter 103. The downlink control information includes a PDSCH/PUSCH resource assignment field, an HARQ process number field, and a New Date Indicator (NDI) field. The controller 102 can include a part of configuration information for the contention based transmission in the downlink control signal.

Cyclic Redundancy Check (CRC) is generated for a data sequence of the generated DCI format. For the CRC, encryption (scrambling) by the Cell-Radio Network Temporary Identifier (C-RNTI) is performed. For the C-RNTI, the identifier specific to the contention base can be used. The identifier specific to the contention base may be used for indicating to the terminal apparatus that the uplink data/the uplink control data can be transmitted in the contention based region. The CRC for which the encryption is performed is added to the DCI format. The signal generated as the DCI format is allocated in the PDCCH.

The transmitter 103 generates the downlink reference signal in accordance with the control signal input from the controller 102. The transmitter 103 codes and modulates the broadcast information, the downlink control information, and the downlink data that are input from the higher layer processing unit 101, and generates the PHICH, the PDCCH, the EPDCCH, the PDSCH, and the PBCH, for each terminal apparatus. The transmitter 103 multiplexes the PHICH, the PDCCH, the EPDCCH, the PDSCH, the PBCH, and the downlink reference signal, and transmits the result of multiplexing to the terminal apparatus through the transmit antenna 105.

The coding unit 1031 codes the downlink control information, the downlink data, and the like input from the higher layer processing unit 101, using a coding scheme that is determined beforehand/determined by the higher layer processing unit 101, such as block coding, convolutional coding, turbo coding, or the like. The modulating unit 1032 modulates the coded bits input from the coding unit 1031, using the modulation scheme prescribed beforehand, such as Binary Phase Shift Keying (BPSK), quadrature Phase Shift Keying (QPSK), quadrature amplitude modulation (16QAM), 64QAM, or 256QAM, or the like/determined by the higher layer processing unit 101.

The downlink reference signal generation unit 1033 generates, as the downlink reference signal, a sequence that is already learned by the terminal apparatus. The sequence that is already learned is obtained in accordance with a rule prescribed beforehand based on the physical cell identity (PCI, cell ID) for identifying the base station apparatus 10, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) on the multiplexed modulation symbol or the like and generates an OFDM symbol. The radio transmitting unit 1035 adds a cyclic prefix (CP) to the OFDM symbol and generates a baseband digital signal. Furthermore, the radio transmitting unit 1035 converts the digital signal into an analog signal, removes unnecessary frequency components through filtering, up-converts the result of the removal into a signal of a carrier frequency, performs power amplification, and outputs the resulting signal to the transmit antenna 105 for transmission.

In accordance with the control signal input from the controller 102, the receiver 104 detects (demultiplexes, demodulates, and decodes) the reception signal received from the terminal apparatuses 20 and 30 through the receive antenna 106, and outputs information resulting from the decoding to the higher layer processing unit 101.

The radio receiving unit 1041 converts, by down-converting, an uplink signal received through the receive antenna 106 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1041 removes a portion corresponding to the CP from the digital signal resulting from the conversion. The radio receiving unit 1041 performs Fast Fourier Transform (FFT) on the signal from which the CP has been removed, and extracts a signal in the frequency domain. The signal in the frequency domain is output to the demultiplexing unit 1042. Furthermore, the radio receiving unit 1041 outputs the signal from which the CP has been removed to the identification unit 1045 in the contention based transmission region.

The identification unit 1045 extracts an identification signal in the contention based transmission region. The identification unit 1045 identifies the terminal apparatus that has transmitted the uplink data in a contention based manner using the identification signal. The identification unit 1045 outputs information of the transmission terminal apparatus to the channel estimation unit 1044 and the demultiplexing unit 1042. For example, the transmission terminal apparatus is identified by performing blind detection using correlation processing of the identification signal held by base station apparatus 10 and the extracted identification signal.

The demultiplexing unit 1042 demultiplexes the signal input from the radio receiving unit 1041 into signals such as an uplink data channel, an uplink control channel, and the like based on the uplink radio frame format. The demultiplexing unit 1042 demultiplexes, in the contention based transmission region, using the information of the transmission terminal apparatus identified by the identification unit 1045, a frequency domain signal into an uplink data channel, an uplink control channel, and a reference signal. The demultiplexed reference signal is input to the channel estimation unit 1044. The demultiplexed uplink data channel and uplink control channel are output to the signal detection unit 1043. Note that in the non-contention based transmission region, the demultiplexing unit 1042 performs signal demultiplexing based on radio resource assignment information that is determined beforehand by the base station apparatus 10 using the higher layer processing unit 101 and that is included in the uplink grant of which each of the terminal apparatuses 20 and 30 are notified.

A reference signal (for example, DMRS) that is time-multiplexed with a data signal and transmitted and the information of the identified transmission terminal apparatus are input to the channel estimation unit 1044. The channel estimation unit 1044 estimates a frequency response using the reference signal, and outputs the estimated frequency response for demodulation to the signal detection unit 1043. Additionally, the channel estimation unit 1044 estimates, in a case that a Sounding Reference Signal (SRS) is input, a frequency response used for uplink scheduling in the contention base.

Figure 11:
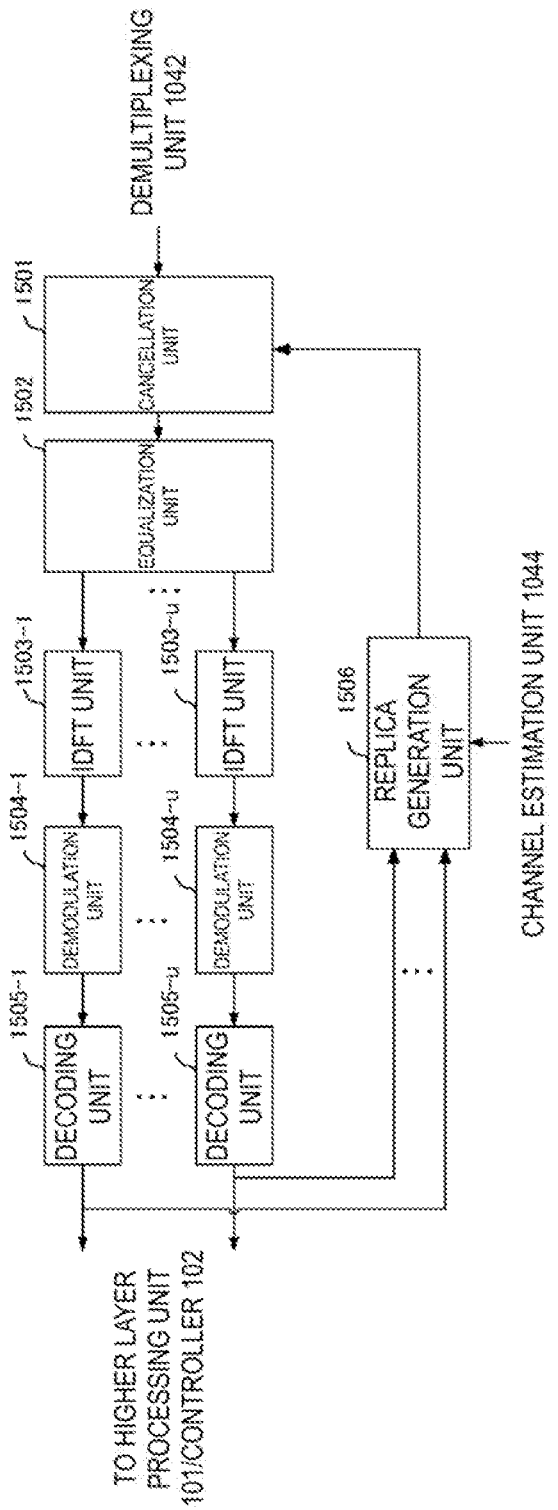
FIG. 11 is a diagram illustrating an example of a signal detection unit according to the first embodiment.

FIG. 11 is a diagram illustrating an example of a signal detection unit according to the present embodiment. The signal detection unit 1043 is configured of a cancellation unit 1501, an equalization unit 1502, IDFT units 1503-1 to 1503-$u$, demodulation units 1504-1 to 1504-$u$, decoding units 1505-1 to 1505-$u$, and a replica generation unit 1506. Here, u represents the number of the terminal apparatuses that are non-orthogonally multiplexed/orthogonally multiplexed at the same time and the same frequency. In the signal detection unit 1043, a signal extracted by the demultiplexing unit 1042 for each terminal apparatus is input to the cancellation unit 1501. The cancellation unit 1501 performs cancellation processing on each reception signal using a soft replica input from the replica generation unit 1506. The equalization unit 1502 generates an equalization weight based on an MMSE criterion from the frequency response input from the channel estimation unit 1044. The equalization unit 1502 multiplies the signal after the soft cancellation (the input signal from the cancellation unit 1501) by the equalization weight. The equalization unit 1502 outputs signals after the equalization for the terminal apparatuses to the IDFT units 1503-1 to 1503-$u$, respectively. The IDFT units 1503-1 to 1503-$u$ convert the reception signals after frequency domain equalization into the time domain signals, respectively. Note that in a case that the terminal apparatus performs a cyclic delay, phase rotation, or interleaving before or after the DFT in the transmission processing, the reception signal after the frequency domain equalization or the time domain signal is subjected to processing for restoring the cyclic delay, the phase rotation, or the interleaving. To the demodulation units 1504-1 to 1504-$u$, although not illustrated, information of a modulation scheme notified beforehand or determined beforehand is input. Each of the demodulation units 1504-1 to 1504-$u$ performs demodulation processing on the time domain signal based on the information of the modulation scheme, and outputs a bit sequence Log Likelihood Ratio (LLR).

To the decoding units 1505-1 to 1505-$u$, although not illustrated, information of a coding rate notified beforehand or determined beforehand is input. The decoding units 1505-1 to 1505-$u$ perform decoding processing on the LLR sequence output from the demodulation unit. In order to perform cancellation processing such as a Successive Interference Canceller (SIC), the turbo equalization, or the like, the decoding units 1505-1 to 1505-$u$ output an external LLR or a posterior LLR output from the decoding unit to the replica generation unit 1506. A difference between the external LLR and the posterior LLR is whether or not the prior LLR input into each of the decoding units 1505-1 to 1505-$u$ is subtracted from the LLR after decoding. Note that in a case that the terminal apparatus applies puncturing (thinning), interleaving, or scrambling to the coded bit string after error correction coding in the transmission processing, the signal detection unit 1043 applies depuncturing (inserting 0 into the LLR of the thinned bit), deinterleaving (restoring rearrangement), or descrambling to the LLR sequence input to the decoding units 1505-1 to 1505-$u$.

The replica generation unit 1506 generates a symbol replica for the LLR sequence input from each of the decoding unit in accordance with the modulation scheme applied to the data transmission by each of the terminal apparatuses. Furthermore, the replica generation unit 1506 generates the soft replica by converting the symbol replica into a frequency domain signal through the DFT, assigning the signal to the resource used by each of the terminal apparatuses, and multiplying the frequency response input from the channel estimation unit 1044. In a case that the number of repetitions of the SIC, the turbo equalization, or the like reaches the prescribed number of times, each of the decoding units 1505-1 to 1505-$u$ performs hard decision for the LLR sequence after decoding and inputs to the higher layer processing unit 101. The decoding units 1505-1 to 1505-$u$ and the higher layer processing unit 101 determine the presence or absence of an error bit through Cyclic Redundancy Check (CRC). The transmitter 103 transmits information of the presence or absence of the error bit (the ACK/NACK in the uplink transmission) by the PHICH/the PDCCH/the EPDCCH. Note that although FIG. 11 illustrates the signal detection using the turbo equalization processing, the maximum likelihood detection, the EMMSE-IRC, or the like can also be used.

Figure 12:
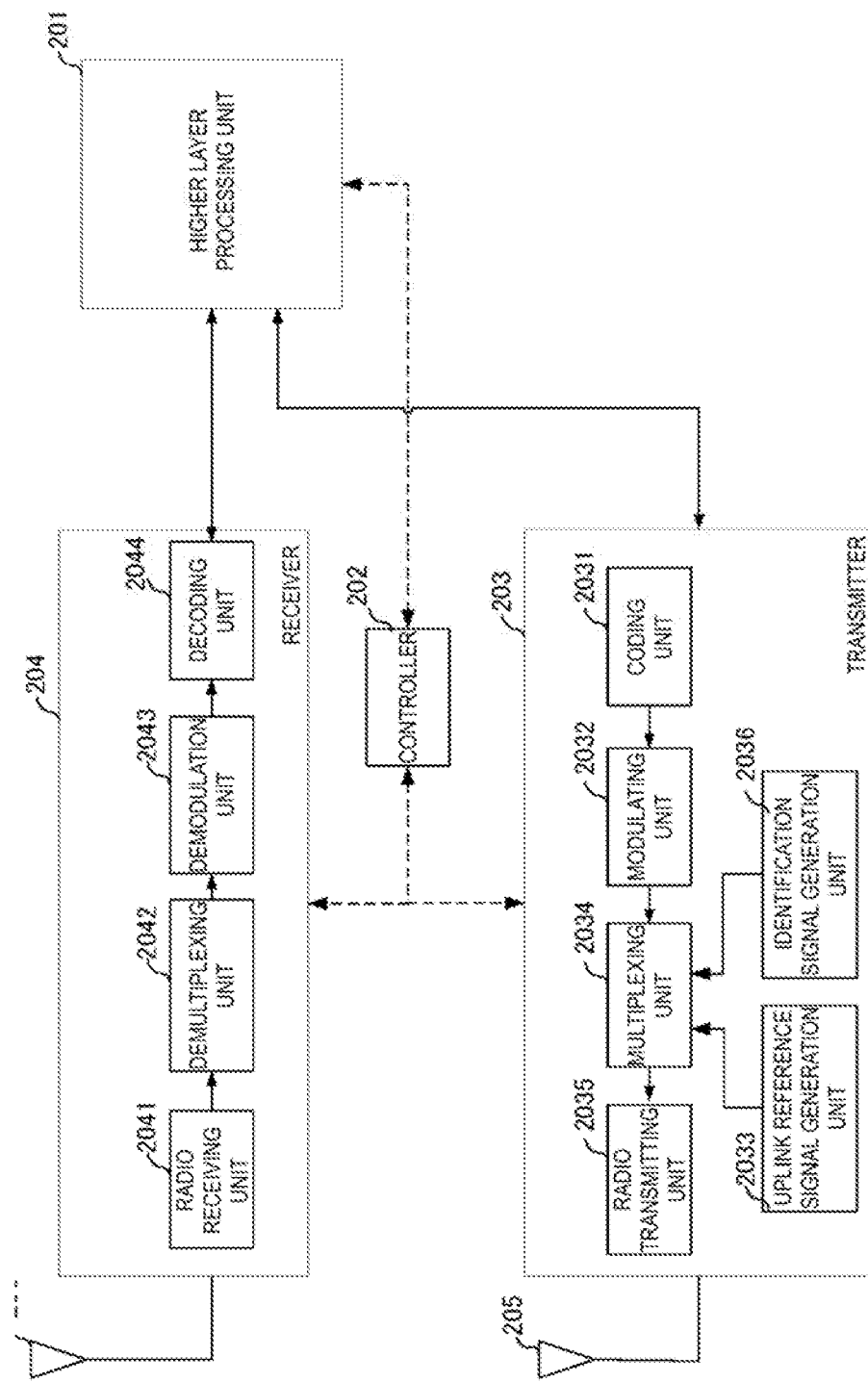
FIG. 12 is a schematic block diagram illustrating a configuration of a terminal apparatus according to the first embodiment.

FIG. 12 is a schematic block diagram illustrating a configuration of the terminal apparatuses 20 and 30 according to the present embodiment. Each of the terminal apparatuses 20 and 30 is configured, including a higher layer processing unit (higher layer processing step) 201, a controller (controlling step) 202, a transmitter (transmitting step) 203, a receiver (receiving step) 204, a transmit antenna 205, and a receive antenna 206. The transmitter 203 is configured, including a coding unit (coding step) 2031, a modulating unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 is configured, including a radio receiving unit (radio receiving step) 2041, a demultiplexing unit (demultiplexing step) 2042, a demodulation unit (demodulating step) 2043, and a decoding unit (decoding step) 2044.

The higher layer processing unit 201 performs processing of the Medium Access Control (MAC) layer, the Packet Data Convergence Protocol (PDCP) layer, the Radio Link Control (RLC) layer, and the Radio Resource Control (RRC) layer. The higher layer processing unit 201 outputs, to the transmitter 203, information (UE Capability) indicating a terminal apparatus function supported by the terminal apparatus itself. For example, the information indicating the terminal apparatus function supported by the terminal apparatus itself includes information indicating that the contention based transmission is supported, information indicating that the carrier aggregation is supported, or the like. In a case that multiple functions compatible with the contention based transmission are present, the higher layer processing unit 201 can transmit information indicating whether the functions are supported on a function-by-function basis. For example, by the higher layer processing unit 201, the information indicating the terminal apparatus function supported by the terminal apparatus itself is subjected to signalling in the RRC layer.

The higher layer processing unit 201 manages various pieces of configuration information of the terminal apparatuses itself. A part of the various pieces of configuration information is input to the controller 202. A part of the various pieces of configuration information is received from the base station apparatus 10 through the receiver 204. The various pieces of configuration information include information indicating the uplink radio frame format. The various pieces of configuration information include the configuration information relating to the contention based transmission received from the base station apparatus 10. The information relating to the contention based transmission includes information relating to the assignment of the contention based transmission region and the assignment of the identification signal to each terminal apparatus, information indicating a configuration of a contention based specific identifier, a parameter indicating setup and release of the contention base, a parameter indicating a cycle (transmission interval) in the contention based transmission, and the contention based transmission subframe, information indicating the contention based transmission configuration change, and the like. The higher layer processing unit 201 manages a radio resource with which the uplink data (transport block) is transmitted in a contention based manner based on the information relating to the contention based transmission.

The higher layer processing unit 201 outputs the uplink data generated by a user operation or the like, to the transmitter 203. The higher layer processing unit 201 can also output the uplink data generated without a user operation (for example, data acquired by a sensor), to the transmitter 203. The higher layer processing unit 201 acquires configuration information of CSI feedback transmitted from the base station apparatus, and outputs the acquired information to the controller 202. The higher layer processing unit 201 outputs the ACK/NACK for the downlink data and the SR to the controller 202.

The higher layer processing unit 101 interprets the downlink control information (DCI) received through the receiver 204, and determines scheduling information. The higher layer processing unit 101 can interpret the information relating to the contention based transmission included in the downlink control information. The higher layer processing unit 101 generates the control information in order to control the receiver 204 and the transmitter 203 in accordance with the scheduling information, and outputs the generated information to the controller 202.

The controller 202 generates the uplink control information (UCI) based on the information input from the higher layer processing unit 201, and outputs the generated information to the transmitter 203. The controller 202 can control, based on the information relating to the contention based transmission, so as to transmit the UCI in a contention based manner. The controller 202 can generate the Cyclic Redundancy Check (CRC) for a data sequence of the UCI format. For the CRC, encryption (scrambling) by the Cell-Radio Network Temporary Identifier (C-RNTI) may be performed. For the C-RNTI, the identifier specific to the contention base can be used. The controller 202 can also encrypt the CRC using the identification signal. The CRC for which the encryption is performed is added to the UCI format. The signal generated as the UCI format is allocated in the uplink control channel transmission region/the contention based transmission region.

The receiver 204 demultiplexes, demodulates, and decodes a reception signal received from the base station apparatus 10 through the receive antenna 206, and outputs the information resulting from decoding to the higher layer processing unit 201. The radio receiving unit 2041 converts, by down-converting, the downlink signal received through the receive antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 2041 removes a portion corresponding to the CP from the digital signal resulting from the conversion, performs fast Fourier transform on the signal from which the CP has been removed, and extracts a signal in the frequency domain.

The demultiplexing unit 2042 demultiplexes the extracted signal in the frequency domain into the downlink channels (the PHICH, the PDCCH, the EPDCCH, and the PDSCH) and the downlink reference signal. The demultiplexing unit 2042 makes a compensation of channels including the PHICH, the PDCCH, the PDSCH, and the EPDCCH based on a channel estimation value obtained from the channel measurement using the downlink reference signal. The demultiplexing unit outputs each downlink channel to the demodulation unit 2043.

The demodulation unit 2043 demodulates the reception signal for each of the modulation symbols of the downlink channel, using the modulation scheme prescribed beforehand, such as BPSK, QPSK, 16QAM, 64QAM, 256QAM, or the like, or using the modulation scheme notified beforehand with the downlink grant.

The decoding unit 2044 decodes the coded bits of each of the downlink channels, which have been demodulated, at a coding rate in compliance with a coding scheme prescribed beforehand, the coding rate being prescribed beforehand or being notified beforehand with the downlink grant, and outputs the decoded uplink data and uplink control information to the higher layer processing unit 201. In a case that the downlink channel is re-transmitted, the decoding unit 2044 performs the decoding with the coded bits input from the higher layer processing unit 201 and retained in an HARQ buffer, and the demodulated coded bits.

The transmitter 203 generates the uplink reference signal in accordance with the control signal input from the controller 202. The transmitter 203 codes and modulates the uplink data (the transport block) input from the higher layer processing unit 201, the uplink control signal, and the like, and generates the PUCCH and the PUSCH. The PUSCH/the PUCCH transmitted in a contention based manner is encrypted (scrambled) using the identification signal. The PUSCH/the PUCCH transmitted in a contention based manner may be encrypted (scrambled) using the C-RNTI. The transmitter 203 multiplexes the PUCCH, the PUSCH, and the generated uplink reference signal, and transmits a result of the multiplexing to the base station apparatus 10 through the transmit antenna 205.

The coding unit 2031 codes the uplink control information input from the higher layer processing unit 201 in compliance with a coding scheme, such as convolutional coding or block coding. The coding unit 2031 codes the uplink data channel through turbo coding or the like.

The modulating unit 2032 modulates coded bits input from the coding unit 2031, in compliance with the modulation scheme notified with the downlink control information, such as BPSK, QPSK, 16QAM, or 64QAM, or in compliance with a modulation scheme prescribed in advance for each channel.

The uplink reference signal generation unit 2033 generates a sequence acquired according to a rule (formula) prescribed in advance, based on a physical cell identifier (also referred to as a Physical Cell Identity (PCI), a cell ID, or the like) for identifying the base station apparatus 10, a bandwidth to which the uplink reference signal is mapped, a cyclic shift notified with the uplink grant, a parameter value for generation of a DMRS sequence, and the like. The uplink reference signal may be multiplied by the identification signal.

The identification signal generation unit 2036 generate a sequence acquired according to a predetermined rule (formula) based on the configuration information relating to the contention based transmission. For example, for the sequence for the identification signal, an orthogonal sequence or quasi-orthogonal sequence such as an M sequence, a Zadoff Chu sequence, an Hadamard sequence, or the like (pseudo orthogonal sequence) can be used.

Based on the assignment of the radio resource included in the downlink control information (UL Grant) or the like, the multiplexing unit 2034 rearranges modulation symbols of the uplink data channel in parallel and then performs Discrete Fourier Transform (DFT) on the rearranged modulation symbols. The multiplexing unit 2034 multiplexes the signals of the uplink control channel and the uplink data channel and the uplink reference signal for each transmit antenna port. In other words, the multiplexing unit 2034 allocates the signals of the uplink control channel and the uplink data channel and the uplink reference signal to the resource element for each transmit antenna port.

The multiplexing unit 2034 allocates the uplink data channel/the uplink control channel/the identification signal to be transmitted in a contention based manner in the resource element in the region, in which the contention based transmission can be performed, assigned to the terminal apparatus itself. The multiplexing unit 2034 allocates the identification signal and the uplink data channel transmitted in a contention based manner to the resource elements with the same frequency band. With this, the identification signal can be used for the identification of the transmission terminal apparatus and the channel estimation.

The radio transmitting unit 2035 performs Inverse Fast Fourier Transform (IFFT) on the multiplexed signal, performs modulation of an SC-FDMA scheme, and generates an SC-FDMA symbol.

The radio transmitting unit 2035 adds the CP to the SC-FDMA symbol and generates a baseband digital signal. Furthermore, the radio transmitting unit 2035 converts the baseband digital signal into an analog signal, removes unnecessary frequency components, up-converts the result of the removal into a signal of a carrier frequency, performs power amplification, and transmits the resulting signal to the base station apparatus 10 through the transmit antenna 205.

As described above, the communication system according to the present embodiment can flexibly control the contention based transmission region and the non-contention based transmission region. Additionally, the communication system transmits the uplink data channel and the uplink control channel in accordance with contents thereof in a contention based manner/a non-contention based manner. Accordingly, even in a cell in which the terminal apparatus that performs the contention based transmission and the terminal apparatus that performs the non-contention based transmission are coexist, it is possible to maintain prescribed communication quality of the uplink data transmitted by each terminal apparatus.

Second Embodiment

A communication system according to the present embodiment is configured of the base station apparatus 10 and the terminal apparatuses 20 and 30 described with reference to FIG. 1, FIG. 10 to FIG. 12. Hereinafter, differences/additional points with respect to the first embodiment will be mainly described.

Figure 13:
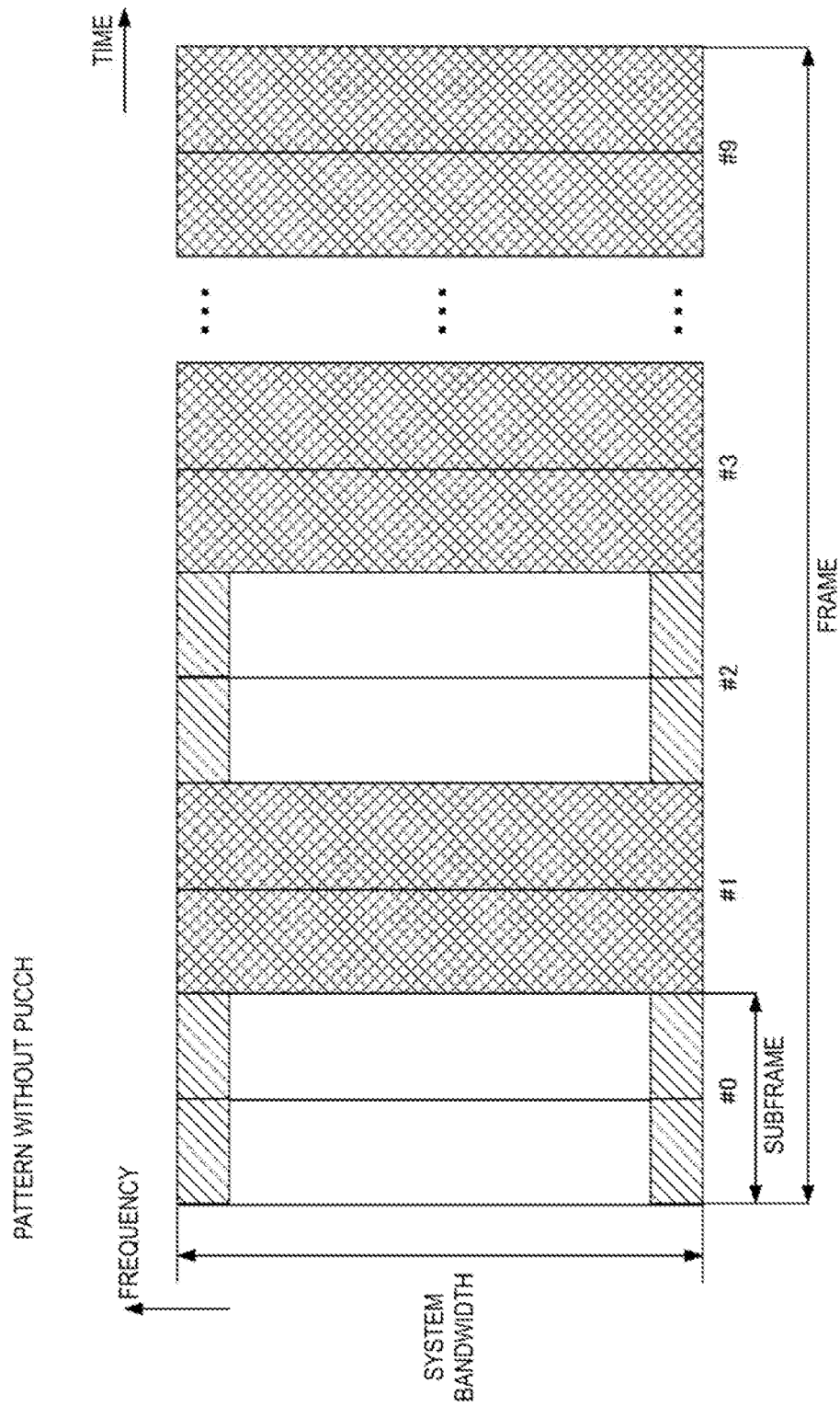
FIG. 13 is a diagram illustrating an example of an uplink radio frame format according to a second embodiment.

FIG. 13 is a diagram illustrating an example of the uplink radio frame format according to the present embodiment. In FIG. 13, a white portion is a region (resource) in which the non-contention based uplink data channel (for example, PUSCH) is transmitted. The shaded portion is a region in which the contention based uplink data channel is transmitted. A rightward-ascending diagonal line portion is a region in which the uplink control channel (for example, PUCCH) is transmitted.

To the contention based uplink data transmission region (shaded portion), the subframe format illustrated in FIGS. 3A to 3C can be applied. Resources for allocating the PRACH and the reference signal (DMRS, SRS, or the like) are configured in prescribed symbols constituting the subframe. For example, the reference signals are allocated across the fourth and 11th system bands of the subframe (not illustrated in FIG. 13 for the sake of simplicity). Hereinafter, in the same manner, the reference signal or the like is omitted unless otherwise stated). The radio frame in FIG. 13 is constituted of the resource element in the same manner as the radio frame illustrated in the first embodiment.

FIG. 13 illustrates an example in which a region in which the uplink data is transmitted in a contention based manner and a region in which the uplink data is transmitted in a non-contention based manner are subjected to time division. The subframes #1, #3, and #9 are subframes reserved for the contention based transmission. In the radio frame format according to the present embodiment, the uplink control channel transmission region (rightward-ascending diagonal line portion) is not included in the contention based transmission subframe.

The base station apparatus 10 can switch the radio frame format that allows only the contention based transmission (FIG. 2A), the radio frame format with the uplink control channel transmission region included in the contention based transmission subframe (FIG. 2B, FIG. 4 to FIG. 7), and the radio frame format with the uplink control channel transmission region included only in the non-contention based transmission subframe (FIG. 13). The base station apparatus 10 can transmit the control information for the contention based transmission subframe configuration using the DCI format/the RRC message/the system information/the broadcast channel/the contention based transmission configuration channel.

To the base station apparatus 10 according to the present embodiment, in the non-contention based transmission region, the uplink sequence in FIG. 8 can be applied. The terminal apparatus 30 transmits the uplink data, in a case of receiving the UL Grant (S106), by the radio resource (resource element) assigned after predetermined time. For example, the terminal apparatus 30 transmits the uplink data four subframes after the reception timing of the UL Grant.

Here, it is assumed that the base station apparatus configures the format in FIG. 13 including the contention based transmission region as the uplink radio frame format. In a case that the terminal apparatus 30 receives the UL Grant at a timing four subframes before the subframe #9 (contention based transmission region) in the downlink, the base station apparatus 10 notifies of the contention based transmission configuration change (S105). The contention based transmission configuration change includes information indicating that the subframe including the radio resource assignment is a subframe of the contention based transmission prohibition. For the contention based transmission configuration change, the DCI/the RRC message/the system information/the contention based transmission configuration channel or the like can be used. Note that the base station apparatus 10 can also replace the contention based transmission configuration change with notification of the release of the contention based transmission subframe.

The base station apparatus 10 transmits, in a case of transmitting the UL Grant in the contention based transmission subframe, information indicating that the subframe is a subframe of the contention based transmission prohibition to the terminal apparatus. The base station apparatus 10 can broadcast the contention based transmission prohibition to the terminal apparatus connecting to the cell. The base station apparatus 10 may transmit the contention based transmission prohibition to the terminal apparatus that receives the transmission grant in the target contention based transmission region. As described above, it is possible to avoid a situation in which the radio resource assigned for the non-contention based transmission overlaps with the contention based transmission region. Accordingly, it is possible to avoid interference due to a collision between the contention based transmission and the non-contention based transmission.

Figure 14:
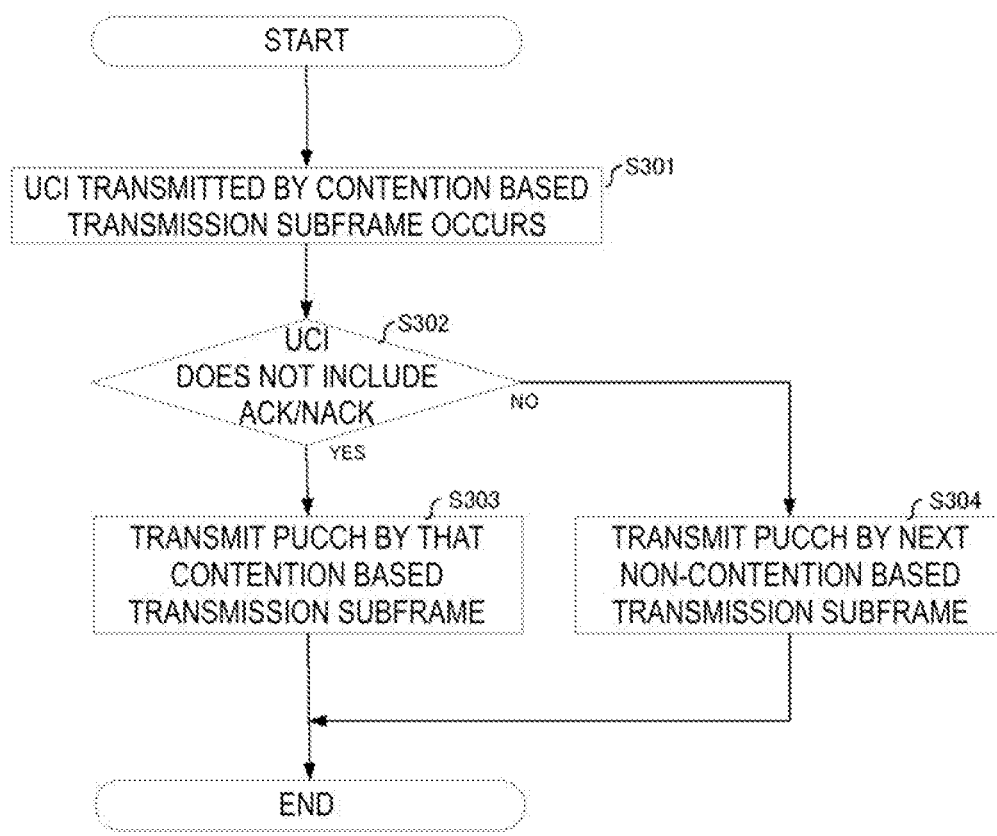
FIG. 14 is a diagram illustrating a sequence example of an uplink control channel transmission according to the second embodiment.

FIG. 14 is a diagram illustrating a sequence example of the uplink control channel transmission according to the present embodiment. The uplink control channel (PUCCH) includes multiple uplink control information (UCI) formats. The UCI including the ACK/NACK occurs a prescribed time after reception of the downlink data channel (for example, four subframes after the reception of the downlink data channel). For example, in a case that the terminal apparatus 30 receives the downlink data channel at a timing four subframes before the subframe #9 in the downlink, a transmission timing of the ACK/NACK is the subframe #9. The UCI including the SR and the CSI periodically occurs.

In a case that the UCI that is transmitted by the contention based transmission subframe occurs (S301), the terminal apparatus determines whether the ACK/NACK is included in the UCI. In a case that the UCI does not include the ACK/NACK (YES at S302), the terminal apparatus transmits the PUCCH including the UCI by the contention based transmission subframe (S303). On the other hand, in a case that the UCI includes the ACK/NACK (NO at S302), the terminal apparatus transmits the PUCCH including the UCI by the next non-contention based transmission subframe (for example, the subframe #0 in FIG. 13) (S304).

In a case that the uplink control channel transmission occurs in the contention based transmission subframe, the communication system according to the present embodiment can also define beforehand a subframe for transmitting the uplink control channel. For example, in a case that the uplink control channel transmission occurs in the contention based transmission subframe, the definition is made such that the uplink control channel is transmitted by the non-contention based transmission subframe N subframes after (N is a natural number) the contention based transmission subframe.

In a case that the uplink control channel transmission occurs in the contention based transmission subframe, in the communication system according to the present embodiment, the transmission subframe is determined in accordance with contents thereof. With this, in accordance with importance/priority of the uplink control information, it is determined which transmission subframe is used for the transmission. As a result, even in a case that the contention based transmission and the non-contention based transmission coexist, each transmission channel can maintain the desired reception quality. Note that the communication systems described in the first and second embodiments can be applied to both the uplink transmission and the downlink transmission of a cellular system. In this case, in the downlink transmission, the transmission and/or reception device in the data transmission is inverted from that of the uplink transmission.

Additionally, in the communication system according to the present embodiment, in a subframe that communicates with the unlicensed band, the contention based transmission is not performed. In other words, the base station apparatus does not configure the subframe (resource) that perform the contention based transmission in a cell that communicate with the unlicensed band. In other words, in a case of communicating with the unlicensed band, the terminal apparatus does not perform the contention based transmission, and communicates through the non-contention based transmission.

A program running on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiments may be partially enabled by a computer. In this case, a program for realizing functions according to the embodiments may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine instead. The above-mentioned electric circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-096132 filed on May 12, 2016, and all the contents of JP 2016-096132 are incorporated in the present international application by reference.

DESCRIPTION OF REFERENCE NUMERALS

10 Base station apparatus
20-1 to 20-n, 30-1 to 30-m Terminal apparatus
10a Range that base station apparatus 10 can be connected to terminal apparatus
101 Higher layer processing unit
102 Controller
103 Transmitter
104 Receiver
105 Transmit antenna
106 Receive antenna
1031 Coding unit
1032 Modulating unit
1033 Downlink reference signal generation unit
1034 Multiplexing unit
1035 Radio transmitting unit
1041 Radio receiving unit
1042 Demultiplexing unit
1043 Signal detection unit
1044 Channel estimation unit
1045 Identification unit
1501 Cancellation unit
1502 Equalization unit
1503-1 to 1503-$u$ IDFT unit
1504-1 to 1503-$u$ Demodulation unit
1505-1 to 1503-$u$ Decoding unit
1506 Replica generation unit
201 Higher layer processing unit
202 Controller
203 Transmitter
204 Receiver
205 Transmit antenna
206 Receive antenna
2031 Coding unit
2032 Modulating unit
2033 Uplink reference signal generation unit
2034 Multiplexing unit
2035 Radio transmitting unit
2036 Identification signal generation unit
2041 Radio receiving unit
2042 Demultiplexing unit
2043 Demodulation unit
2044 Decoding unit

The invention claimed is:

1. A terminal apparatus configured to communicate with a base station apparatus, the terminal apparatus comprising:
reception circuitry configured to receive first radio resource control (RRC) information indicating whether an uplink transmission is supported or not, the uplink transmission being performed without an uplink grant in downlink control information (DCI) and receive a physical downlink control channel (PDCCH) with the DCI, and
transmission circuitry configured to transmit an uplink signal via a first physical uplink shared channel (PUSCH), wherein
in a case where the reception circuitry receives the first RRC information which includes a first time domain allocation, the first time-domain allocation indicating a start symbol and a number of consecutive symbols, the transmission circuitry transmits uplink data via the first PUSCH based on the first time domain allocation without a detection of an uplink grant in the DCI.

2. The terminal apparatus according to claim 1, wherein the terminal apparatus is configured to communicate with the base station apparatus using a plurality of serving cells including a primary cell and a secondary cell, and the transmission circuitry is configured to transmit the uplink data via the first PUSCH in a first serving cell of the plurality of serving cells based on the first time domain allocation for the first serving cell without a detection of an uplink grant in the DCI.

3. The terminal apparatus according to claim 2, wherein in a case where the reception circuitry receives second RRC information which includes a second time domain allocation for a second serving cell of the plurality of serving cells, the second time-domain allocation indicating a start symbol and a number of consecutive symbols, the transmission circuitry transmits the uplink data via a second PUSCH in the second serving cell based on the second time domain allocation without a detection of an uplink grant in the DCI.

4. A base station apparatus configured to communicate with a terminal apparatus, the base station apparatus comprising:

transmission circuitry configured to transmit first radio resource control (RRC) information indicating whether an uplink transmission is supported or not, the uplink transmission being performed without an uplink grant in downlink control information (DCI) and transmit a physical downlink control channel (PDCCH) with the DCI, and reception circuitry configured to receive an uplink signal via a first physical uplink shared channel (PUSCH), wherein in a case where the transmission circuitry transmits the first RRC information which includes a first time domain allocation, the first time-domain allocation indicating a start symbol and a number of consecutive symbols, the reception circuitry receives unlink data via the first PUSCH, the first PUSCH being transmitted based on the first time domain allocation without a detection of an uplink grant in the DCI.

5. The base station apparatus according to claim 4, wherein the base station apparatus is configured to communicate with the terminal apparatus using a plurality of serving cells including a primary cell and a secondary cell, and the reception circuitry is configured to receive the uplink data via the first PUSCH in a first serving cell of the plurality of serving cells, the first PUSCH being transmitted based on the first time domain allocation for the first serving cell without a detection of an uplink grant in the DCI.

6. The base station apparatus according to claim 5, wherein in a case where the transmission circuitry transmits second RRC information which includes a second time domain allocation for a second serving cell of the plurality of serving cells, the second time-domain allocation indicating a start symbol and a number of consecutive symbols, the reception circuitry receives the uplink data via a second PUSCH in the second serving cell, the second PUSCH being transmitted based on the second time domain allocation without a detection of an uplink grant in the DCI.

7. A communication method for a terminal apparatus configured to communicate with a base station apparatus, the communication method comprising:

receiving radio resource control (RRC) information indicating whether an uplink transmission is supported or not, the uplink transmission being performed without an uplink grant in downlink control information (DCI), receiving a physical downlink control channel (PDCCH) with the DCI, and transmitting an uplink signal via a first physical uplink shared channel (PUSCH), wherein in a case of receiving the RRC information which includes a time domain allocation, the time-domain allocation indicating a start symbol and a number of consecutive symbols, uplink data is transmitted via the first PUSCH based on the time domain allocation without a detection of an uplink grant in the DCI.

8. A communication method for a base station apparatus configured to communicate with a terminal apparatus, the communication method comprising:

transmitting radio resource control (RRC) information indicating whether an uplink transmission is supported or not, the uplink transmission being performed without an uplink grant in downlink control information (DCI), transmitting a physical downlink control channel (PDCCH) with the DCI, and receiving an uplink signal via a first physical uplink shared channel (PUSCH), wherein in a case of transmitting the RRC information which includes a time domain allocation, the time-domain allocation indicating a start symbol and a number of consecutive symbols, unlink data is received via the first PUSCH, the first PUSCH being transmitted based on the time domain allocation without a detection of an uplink grant in the DCI.

* * * * *